US012726440B2

(12) United States Patent
Livne et al.

(10) Patent No.: US 12,726,440 B2
(45) Date of Patent: Sep. 1, 2026

(54) 2 LAYER ALPHA BASED BUFFER MANAGEMENT WITH DYNAMIC RED

(71) Applicant: Intel Corporation, Santa Clara, CA (US)

(72) Inventors: Sarig Livne, Schanya (IL); Nrupal Jani, Hillsboro, OR (US); Eli Shapiro, Katzir (IL); Parthasarathy Sarangam, Portland, OR (US); Neerav Parikh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/968,713

(22) Filed: Oct. 18, 2022

(65) Prior Publication Data

US 2023/0056330 A1 Feb. 23, 2023

(51) Int. Cl.
*G06F 13/00* (2006.01)
*H04L 47/11* (2022.01)
*H04L 49/9005* (2022.01)

(52) U.S. Cl.
CPC .......... *H04L 47/11* (2013.01); *H04L 49/9005* (2013.01)

(58) Field of Classification Search
CPC ......... H04L 47/11; H04L 47/10; H04L 47/00; H04L 47/12; H04L 47/125; H04L 47/127; H04L 49/9005
USPC .......................... 709/238, 213, 215; 370/412
See application file for complete search history.

(56) References Cited

U.S. PATENT DOCUMENTS

| | | | | |
|---|---|---|---|---|
| 7,948,880 | B2 * | 5/2011 | Kwan | H04L 47/2441 370/232 |
| 9,154,452 | B2 * | 10/2015 | Thottan | H04L 49/9005 |
| 11,356,066 | B1 * | 6/2022 | Zhao | H03F 1/3294 |
| 2006/0092837 | A1 * | 5/2006 | Kwan | H04L 47/266 370/468 |
| 2013/0259063 | A1 * | 10/2013 | Thottan | H04L 49/9005 370/419 |

OTHER PUBLICATIONS

Hussein Abdel-Jaber et al.; Random Early Dynamic Detection Approach for Congestion Control; 2014; Baltic J. Modern Computing, vol. 2 (Year: 2014).*

* cited by examiner

*Primary Examiner* — Kenneth R Coulter
(74) *Attorney, Agent, or Firm* — Compass IP Law PC

(57) ABSTRACT

Methods and apparatus for two-layer Alpha-based buffer management with dynamic RED. A two-layer hierarchical sharing scheme using alpha parameters is provided. A buffer is dynamically shared across upper-level entities, such as hosts, using one set of alpha parameters, then a dynamically-adjusted buffer portion allocated for an upper level entity is shared among its lower level entities (e.g., sub queues) using a separate set of low-level alpha parameters. The memory spaces for the upper- and lower-level entities may be dynamically redistributed. Determinations to drop and/or mark and ECN field of received packets are performed using Dynamic RED, which employs dynamic thresholds and associated dynamic probabilities.

20 Claims, 15 Drawing Sheets

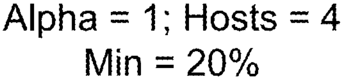
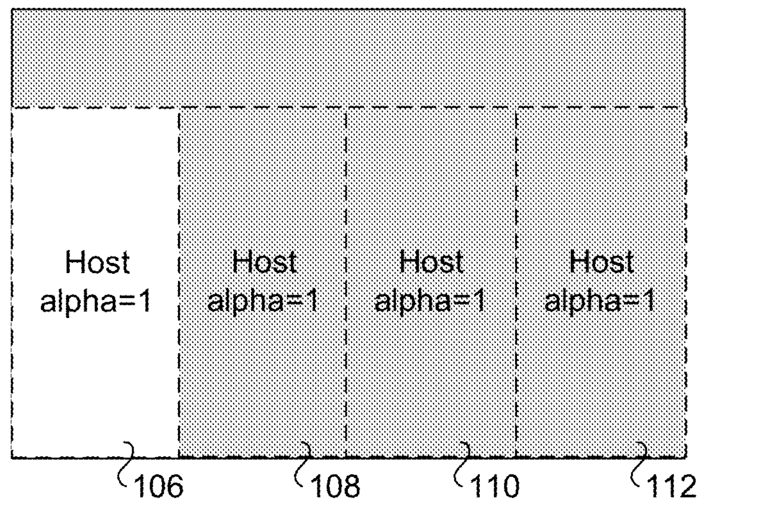
*Fig. 1c*
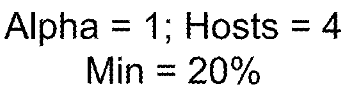
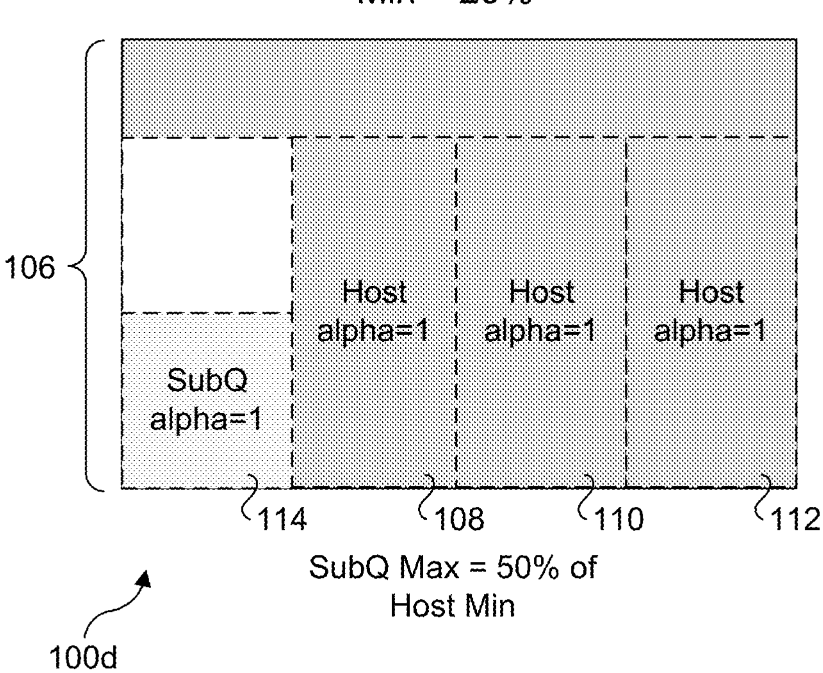
*Fig. 1d*

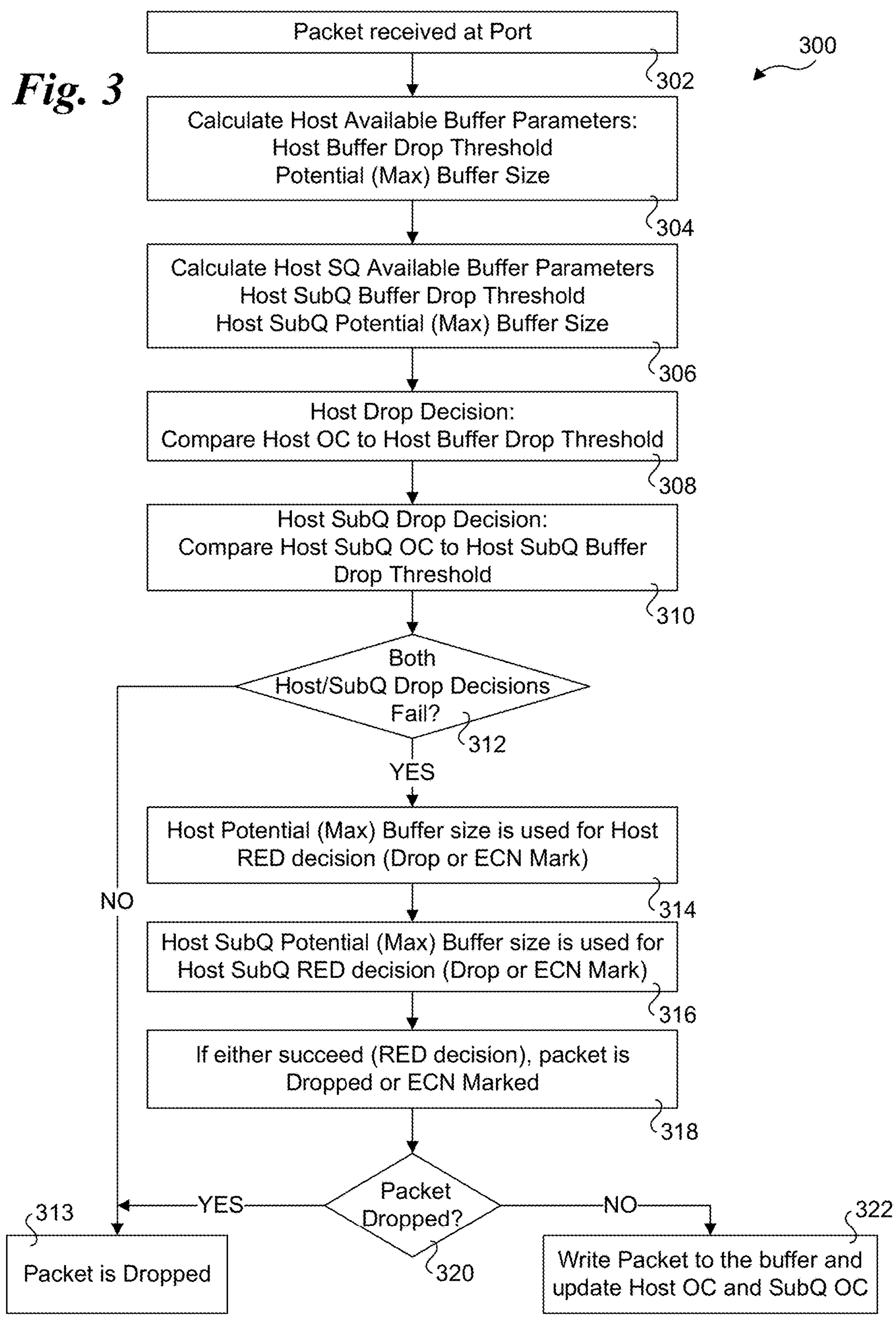
Fig. 3
300
Packet received at Port
302
Calculate Host Available Buffer Parameters:
Host Buffer Drop Threshold
Potential (Max) Buffer Size
304
Calculate Host SQ Available Buffer Parameters
Host SubQ Buffer Drop Threshold
Host SubQ Potential (Max) Buffer Size
306
Host Drop Decision:
Compare Host OC to Host Buffer Drop Threshold
308
Host SubQ Drop Decision:
Compare Host SubQ OC to Host SubQ Buffer Drop Threshold
310
Both Host/SubQ Drop Decisions Fail?
312
YES
NO
Host Potential (Max) Buffer size is used for Host RED decision (Drop or ECN Mark)
314
Host SubQ Potential (Max) Buffer size is used for Host SubQ RED decision (Drop or ECN Mark)
316
If either succeed (RED decision), packet is Dropped or ECN Marked
318
Packet Dropped?
320
YES
NO
313
Packet is Dropped
322
Write Packet to the buffer and update Host OC and SubQ OC Free = 1400KB
Host 1 OC = 0
Potential Buffer = 700KB
SQ Potential Buffer = 350KB Free = 1400KB
Host 1 SQ OC = 200
Potential Buffer = 800KB
Host Free Buffer = 600KB
SQ Buffer = 200KB
SQ Potential Buffer = 400KB

2 LAYER ALPHA BASED BUFFER MANAGEMENT WITH DYNAMIC RED

BACKGROUND INFORMATION

Packets received at network ports are temporarily stored (buffered) in receive packet buffers before they are processed by a packet processing pipeline. Under some implementations, the receive buffer is shared by multiple two-level entities (e.g., Host with SubPorts or Port with Traffic Classes for which buffer size is limited and dynamic sharing is required). The sharing is required to be done in two layers and provide some buffer guarantee as well as maximum limit for both the upper level entities (e.g. Host, Ports) and the lower level entities (SubPort or Traffic Classes).

In addition, some systems utilize Data Center Transaction Control Protocol (DCTCP) or other network congestion protocols for congestion management. These network congestion protocols may utilize Random Early Detection (RED) RED drops and/or Explicit Congestion Notification (ECN) marking.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

Figure 2:
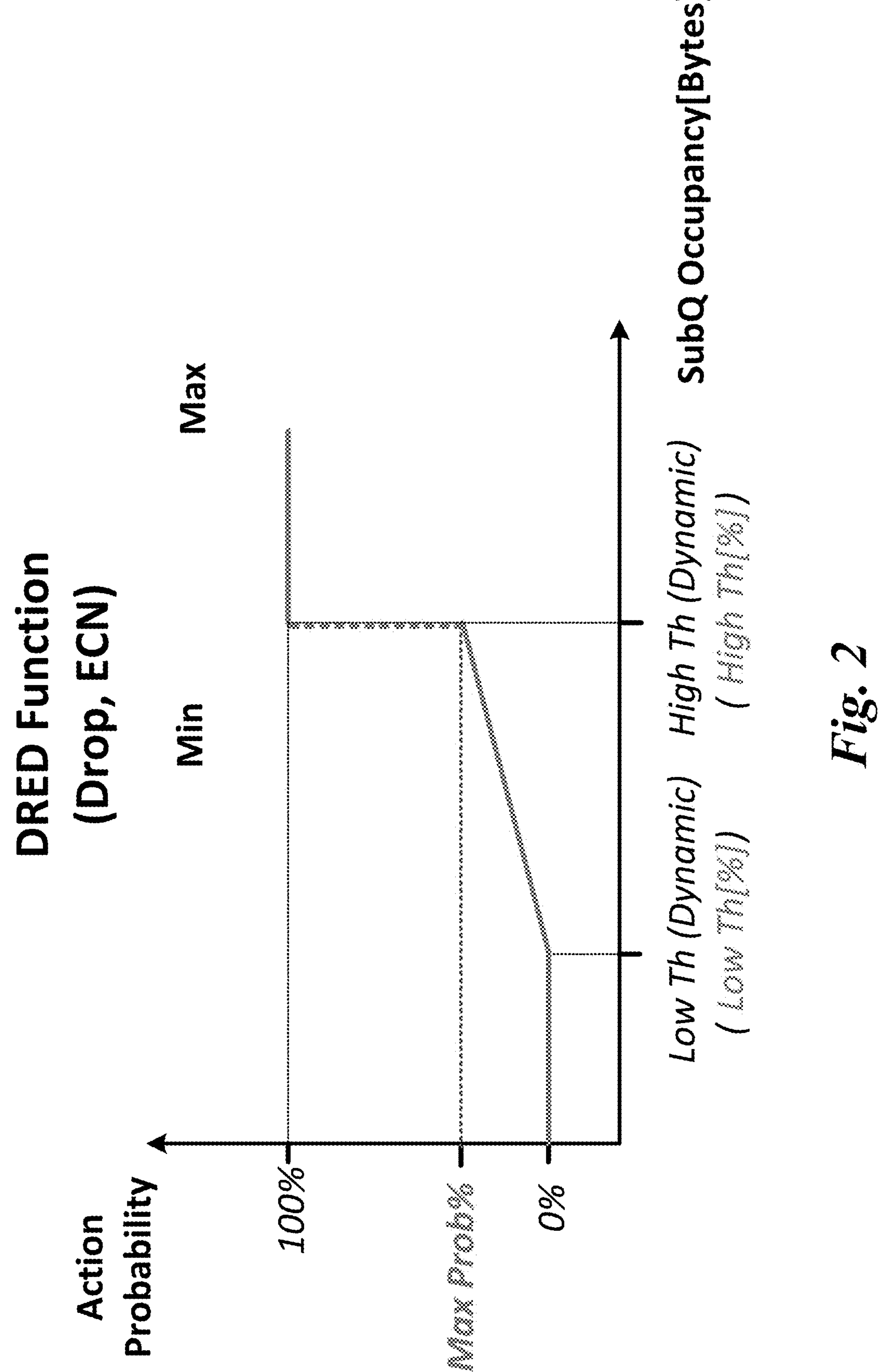
Figure 4A:
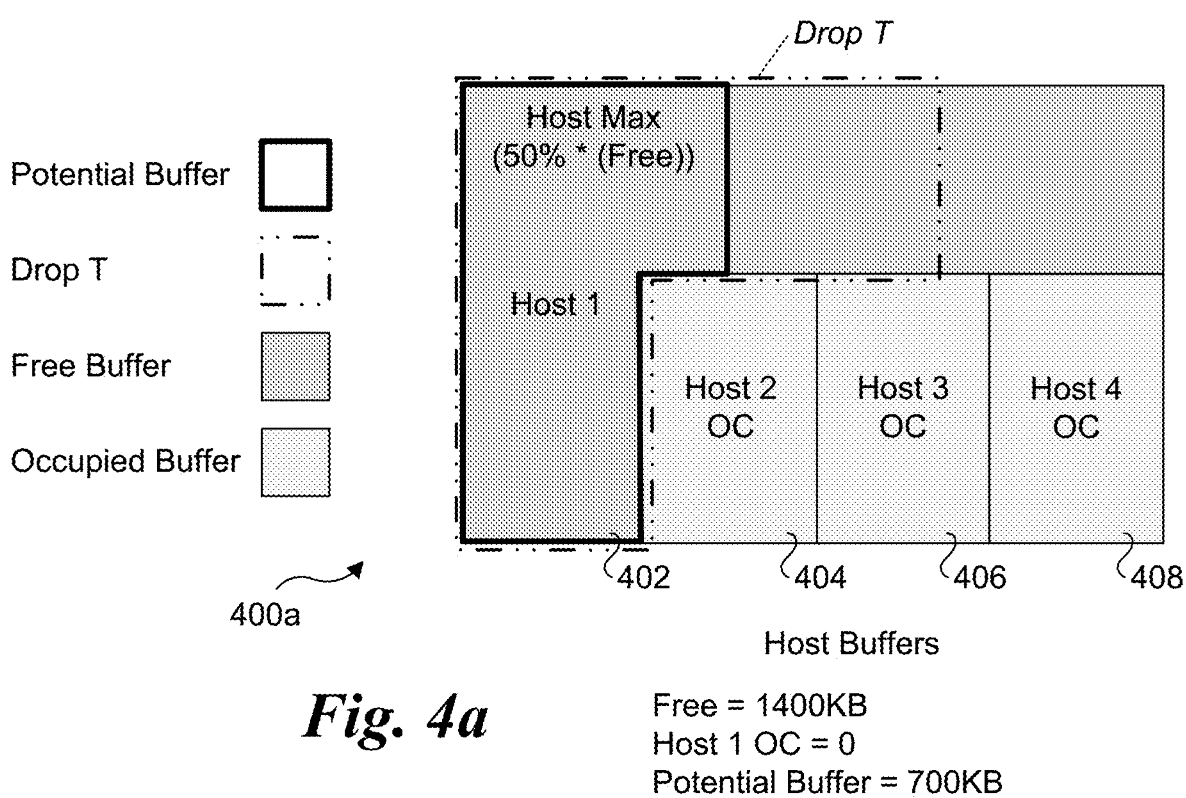
Figure 4B:
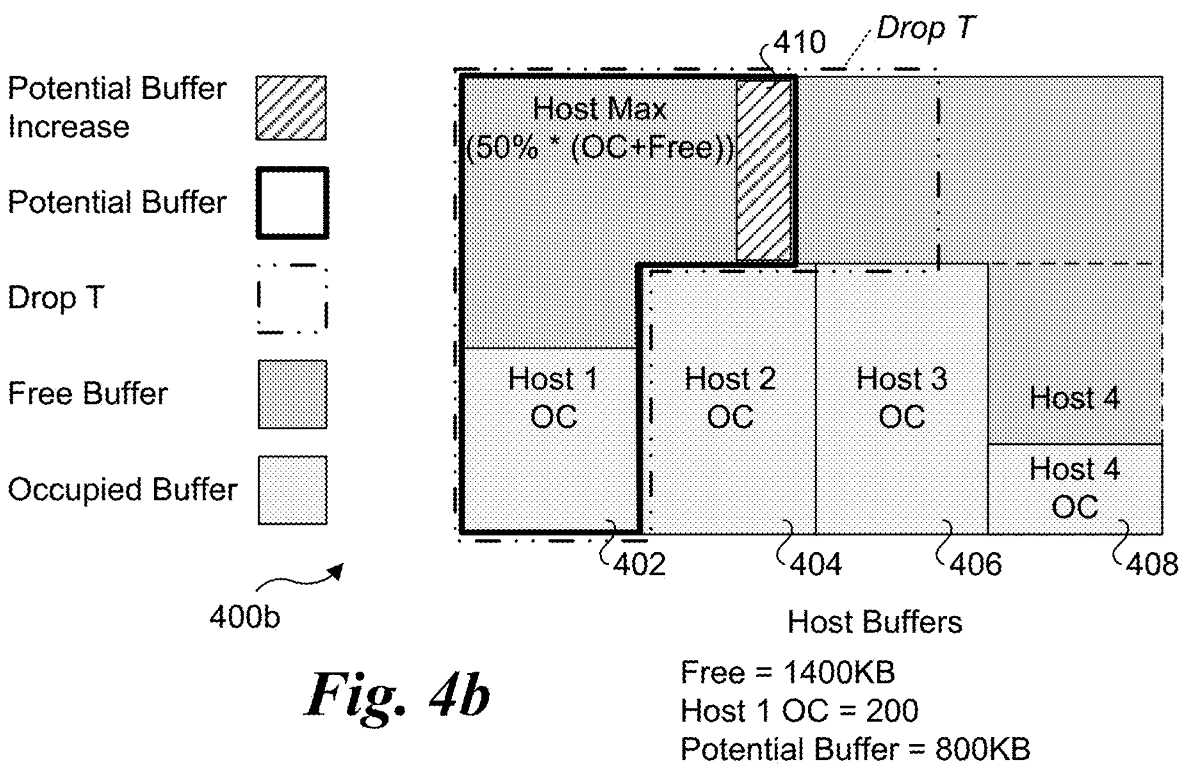
Figure 4C:
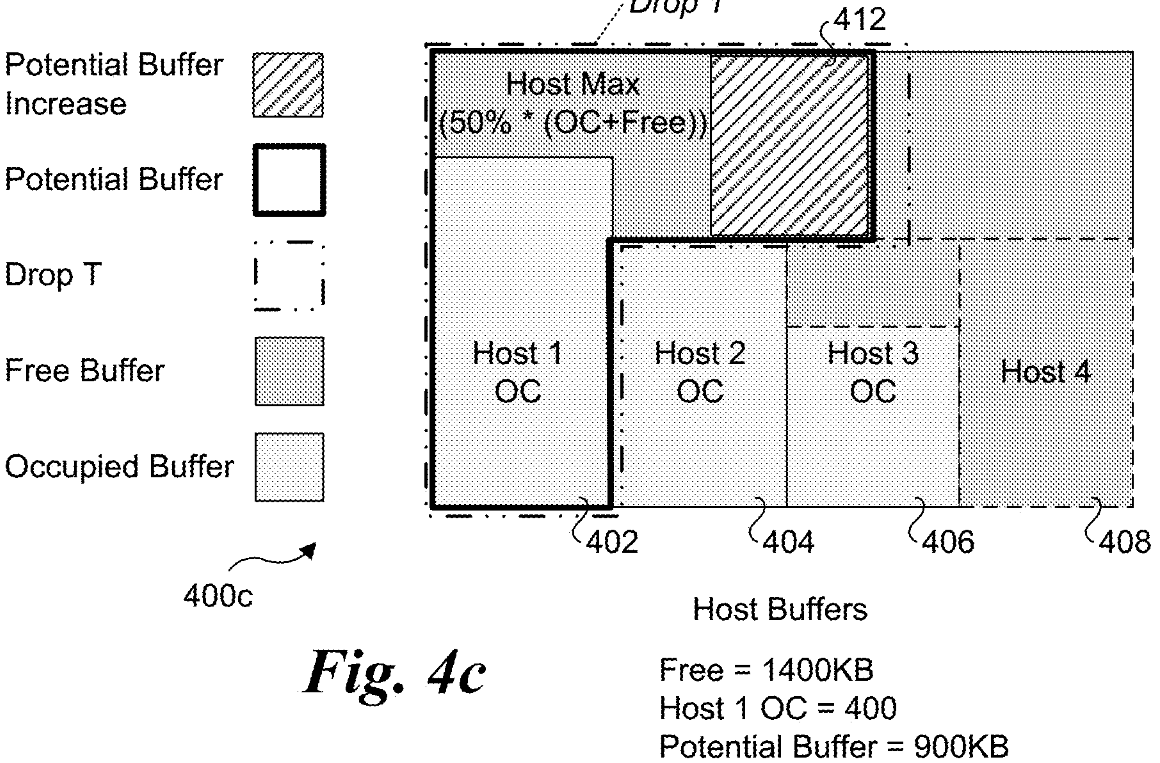
Figure 6:
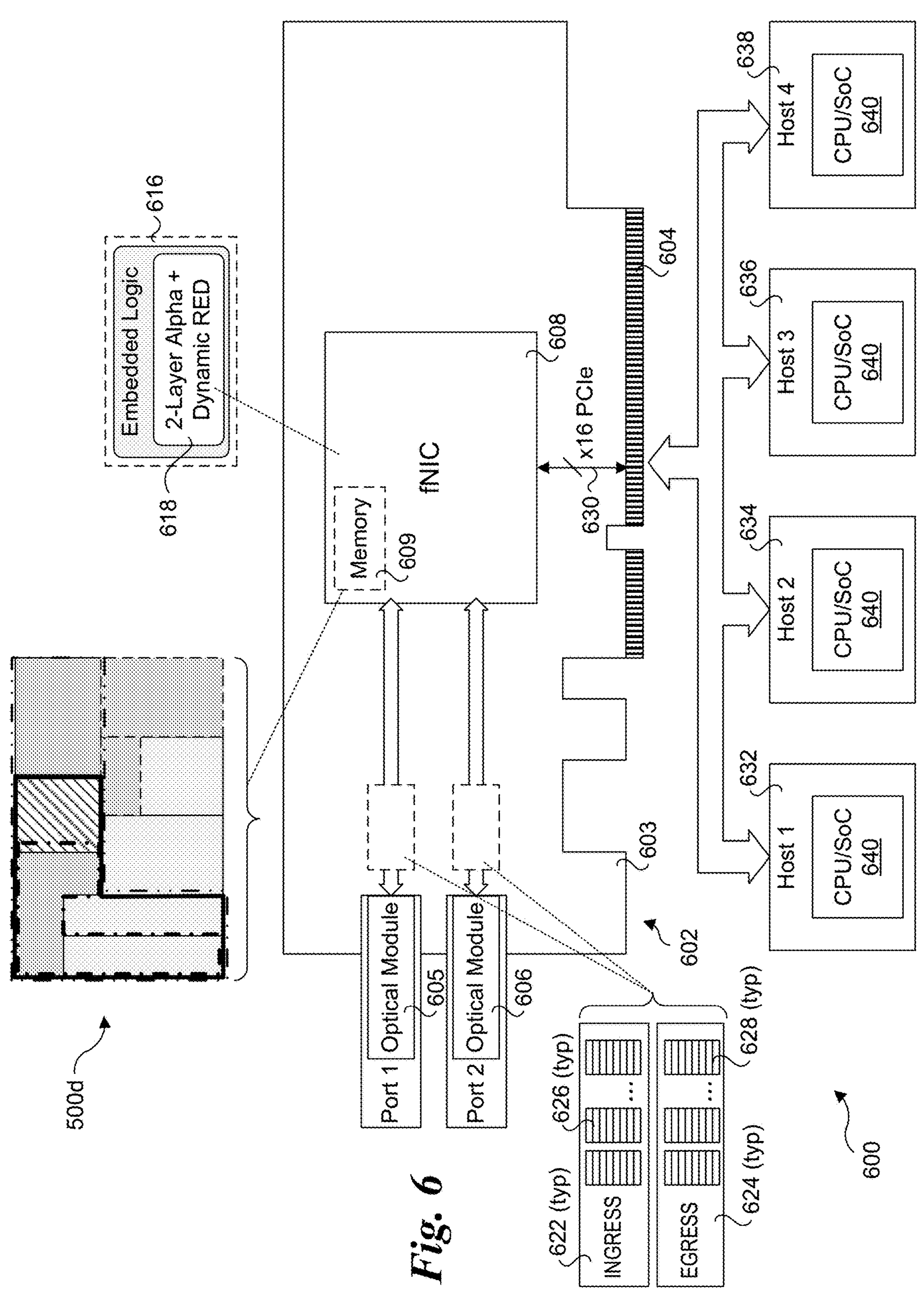
Figure 7:
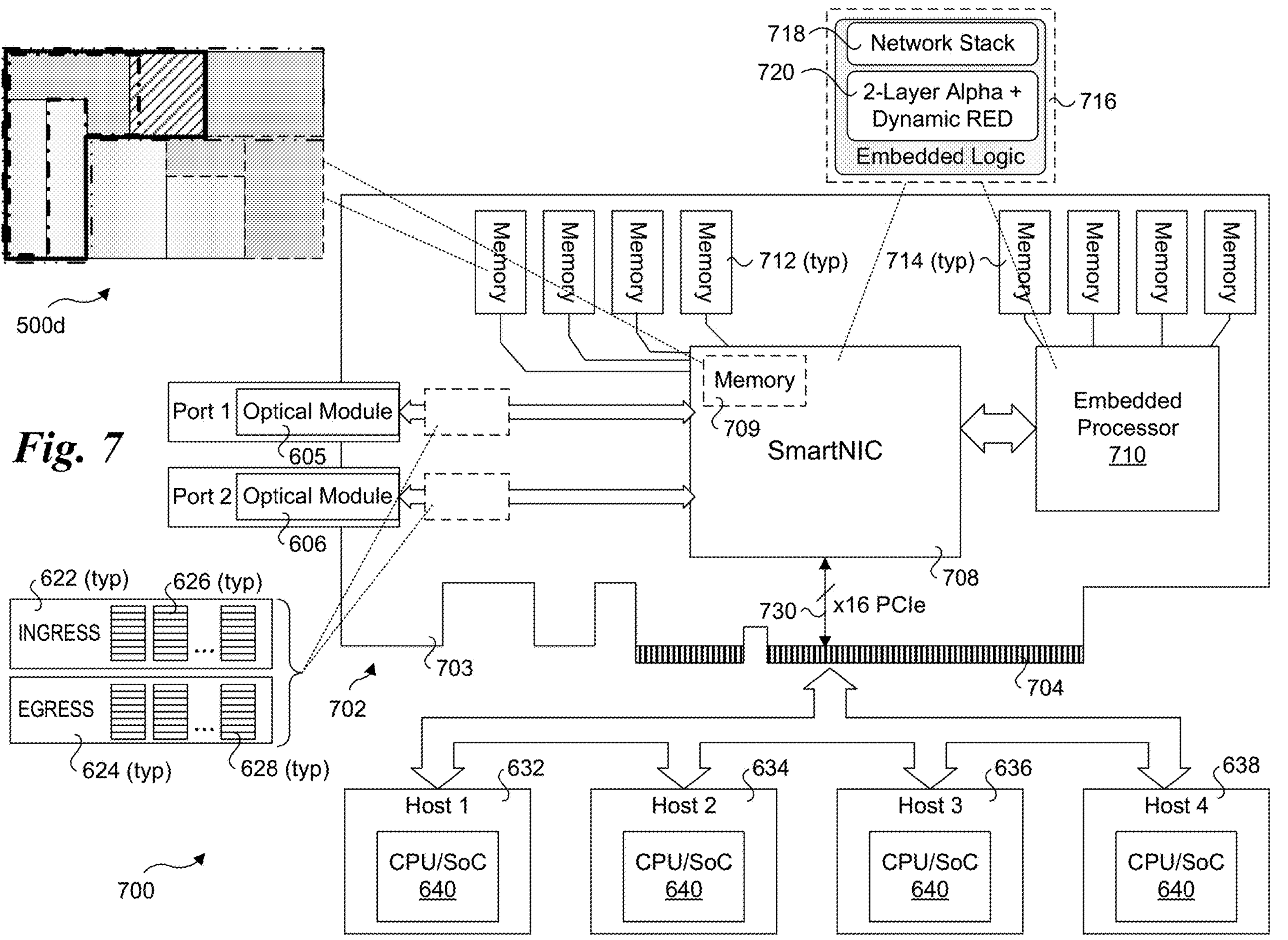
Figure 8:
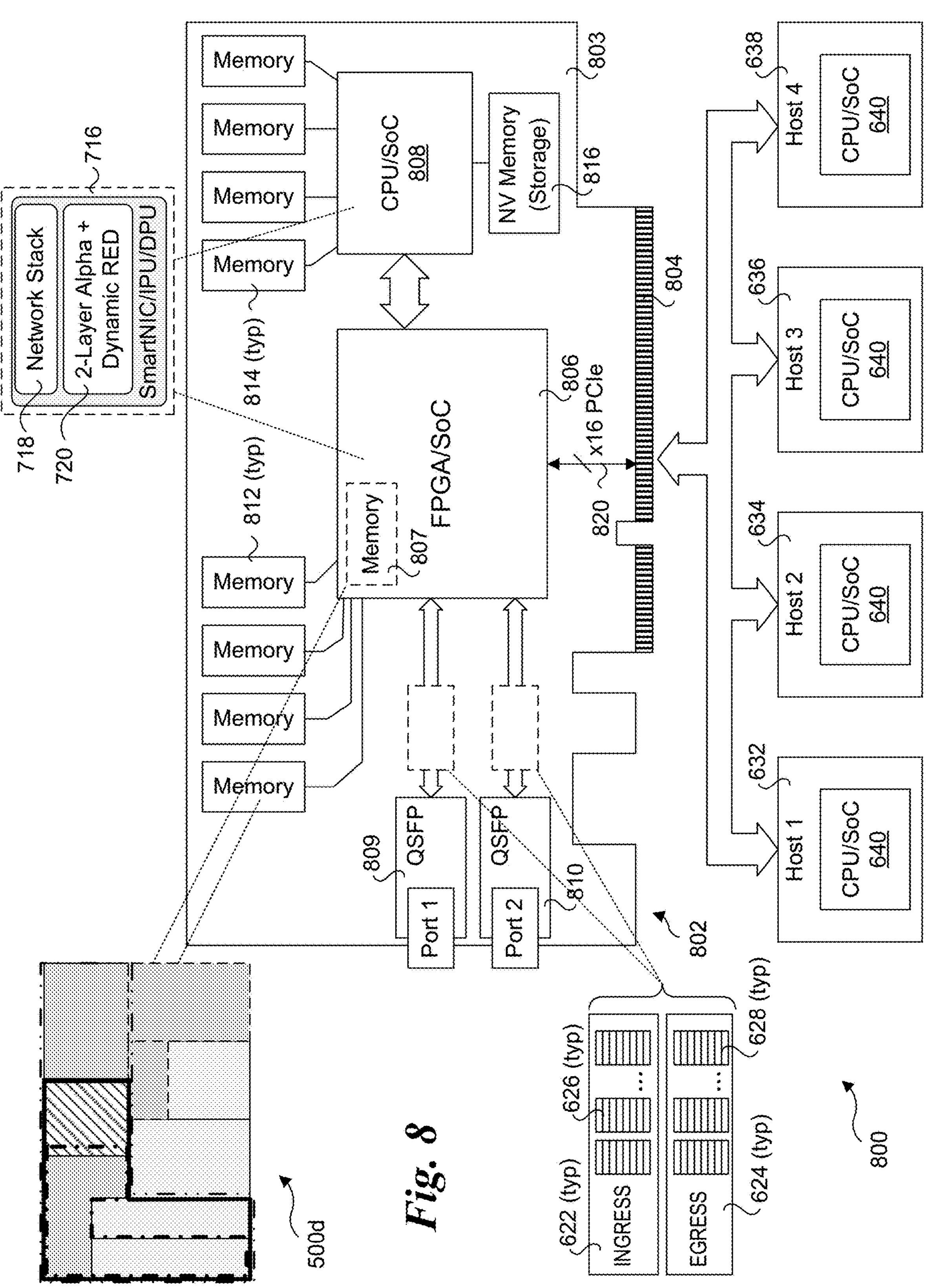
Figure 9:
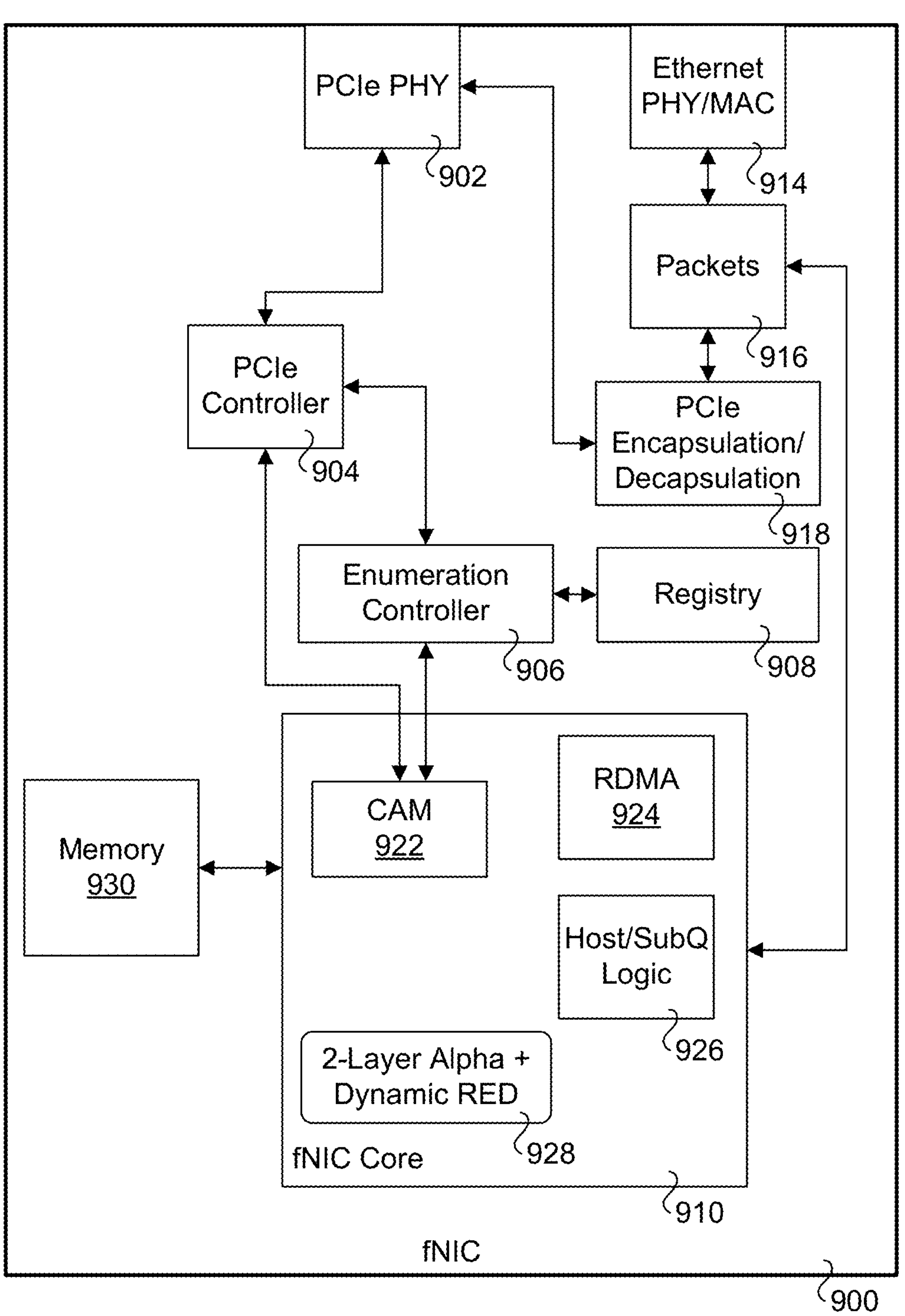

Figure if shows a shared buffer configuration including four hosts with a first host buffer having five sub queue buffers;

FIG. 2 is a graph illustrating an example of a Dynamic RED (DRED) function, according to one embodiment;

FIG. 3 is a flowchart illustrating operating and logic for implementing two-level alpha memory management with DRED, according to one embodiment;

FIGS. 4*a*, 4*b*, and 4*c* illustrate examples of shared buffer configurations under which the buffer space is shared among four hosts and including host potential buffers;

FIGS. 5*a*, 5*b*, 5*c*, and 5*d* illustrate examples of shared buffer configurations further depicting SQ potential buffers in addition to host potential buffers;

FIG. 6 is a diagram of an exemplary fNIC card, according to one embodiment;

FIG. 7 is a diagram of an exemplary SmartNIC card, according to one embodiment;

FIG. 8 is a diagram of an exemplary IPU card, according to one embodiment;

FIG. 9 is a block diagram of an fNIC, according to one embodiment; and

Figure 10:
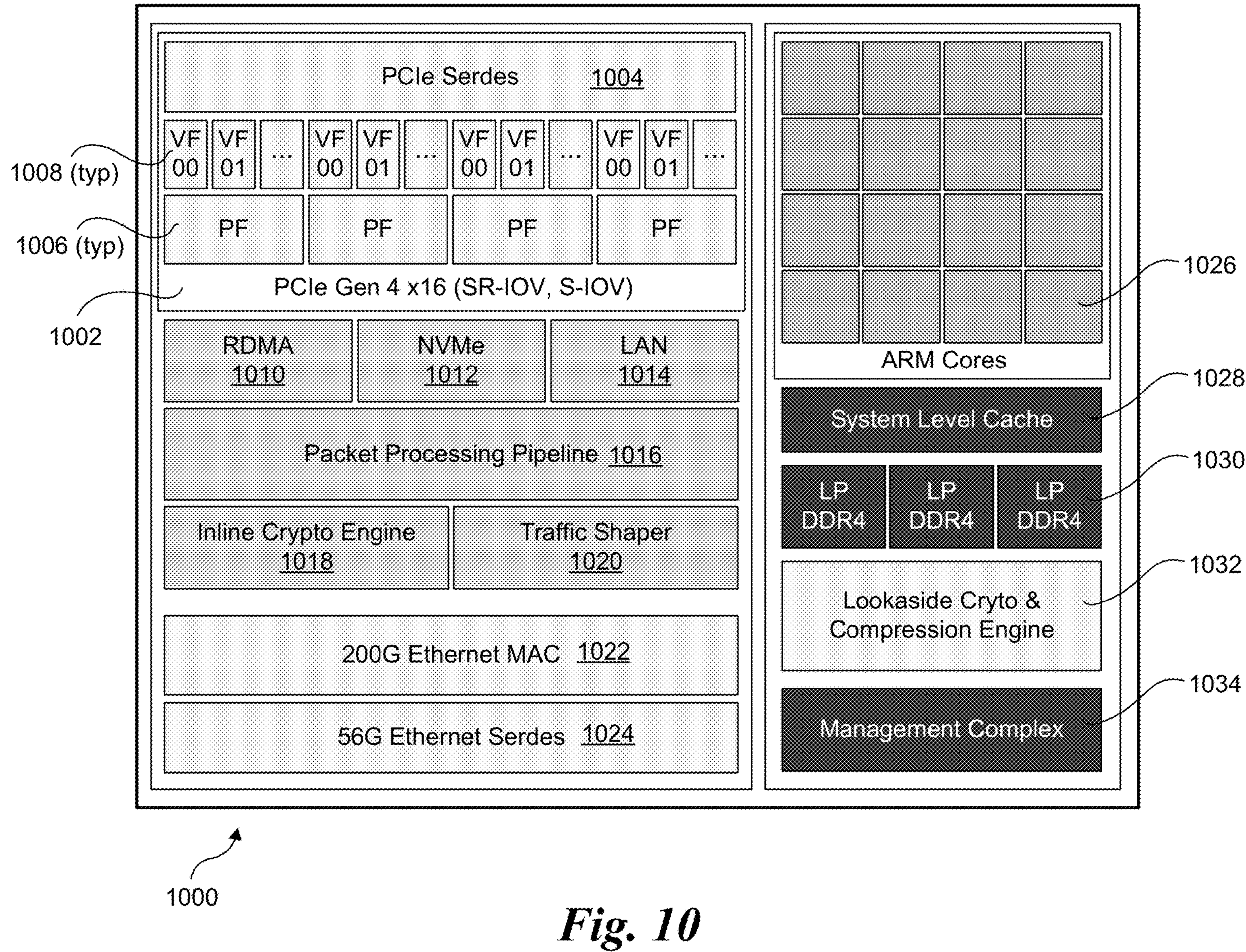

FIG. 10 is a block diagram of an exemplary IPU chip; and

Figure 11:
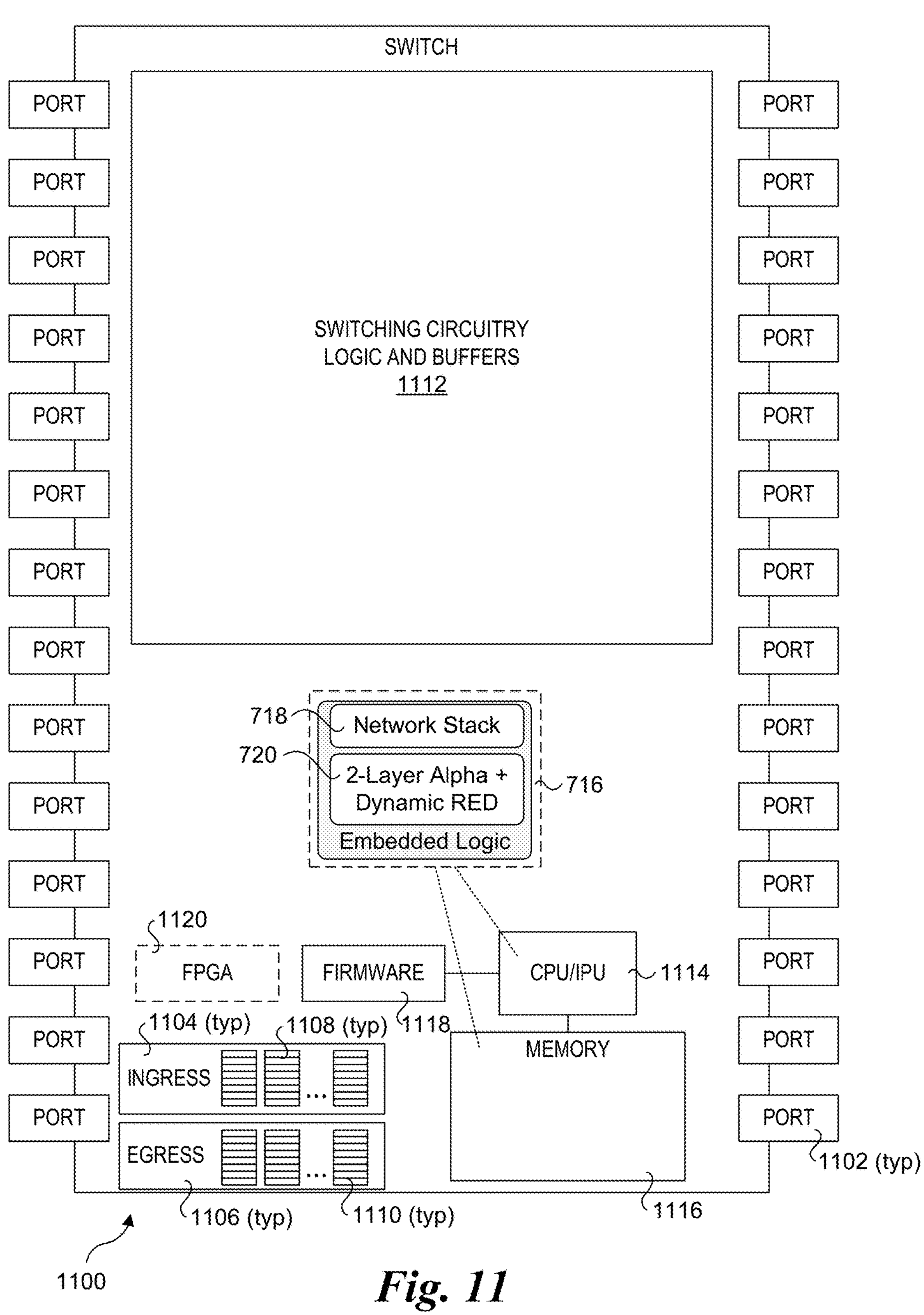

FIG. 11 is a diagram of a switch configured with circuitry and logic for implementing aspects of the embodiments disclosed herein.

DETAILED DESCRIPTION

Embodiments of methods and apparatus for two-layer Alpha-based buffer management with dynamic RED are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiment described and illustrated herein, a two-layer hierarchical sharing scheme using alpha parameters is provided. First, a buffer is dynamically shared across upper-level entities using one set of alpha parameters, then a dynamically-adjusted buffer portion allocated for an upper level entity is shared among its lower level entities using a separate set of low-level alpha parameters. In one aspect, a dynamic RED (DRED) algorithm is implemented under with RED is dynamically applied (on upper and/or lower entities simultaneously). In one embodiment, DRED and defined as a percentage from the buffer dynamically allocated per entity.

The two-layer Alpha+DRED algorithm provides the following characteristics:

Keeps Alpha fairness across Hosts dynamically

Keeps Alpha fairness across Sub-Queues (SQs) within a Host dynamically

Provides pseudo Min (guaranteed) buffer—pseudo Static

Provides Max Buffer limit—Static

RED Drop decision may be based on Static or dynamic profile

Drop Alpha Thresholds and RED are calculated on each packet arrival

In the following examples a shared buffer management scheme for a NIC (Network Interface Controller) system is described that uses 4 upper-level entities (Hosts), each with up to 8 lower-level entities called Sub-Queues (aka SubQ or SQs). Each of the upper-level and lower-level entities has an Occupancy Counter (OC) that monitors the amount of buffer consumed by the entity and is used for calculating buffer availability. In the following description and Figures, a Host OC represents the portion of the shared buffer that is allocated to that Host that is occupied.

The "alpha" parameter (also represented by the Greek letter a) is used to define a threshold used to determine whether to buffer or drop packets received at port for which a shared buffering scheme is implemented. Generally, the value for alpha herein is 0<alpha≤n, where n is an integer. Under one embodiment, the alpha parameter for both hosts and SQs may be set to a value from a list of predefined values such as but not limited to {1/32, 1/16, 1/8, 1/4, 1/2, 1, 2, 4, 8, 16, 32}. Other values for alpha may also be used in other embodiments.

Dual alpha derived parameters are defined for SQ/Host minimal buffer (pseudo guaranteed) and SQ/Host maximum buffer. Parameters that are defined for Dynamic RED include a high threshold–percentage from potential buffer; a low threshold–percentage from potential buffer; and maximum probability–drop probability.

The following definitions and equations are employed by the dual alpha algorithm, according to one embodiment.

Drop *T*=Alpha*Free Buffer

Max Buffer=Alpha/(1+Alpha)

Min Buffer=Alpha/(1+Sum(All Alphas))

Host Potential Buffer–The buffer the host can grow up to =Available Buffer(Host)*Max Buffer (Host)

Total Free Buffer=Total Buffer–All Hosts OCs

Host Free Buffer=Host Potential Buffer–Host SQ OCs

Figure 1A:
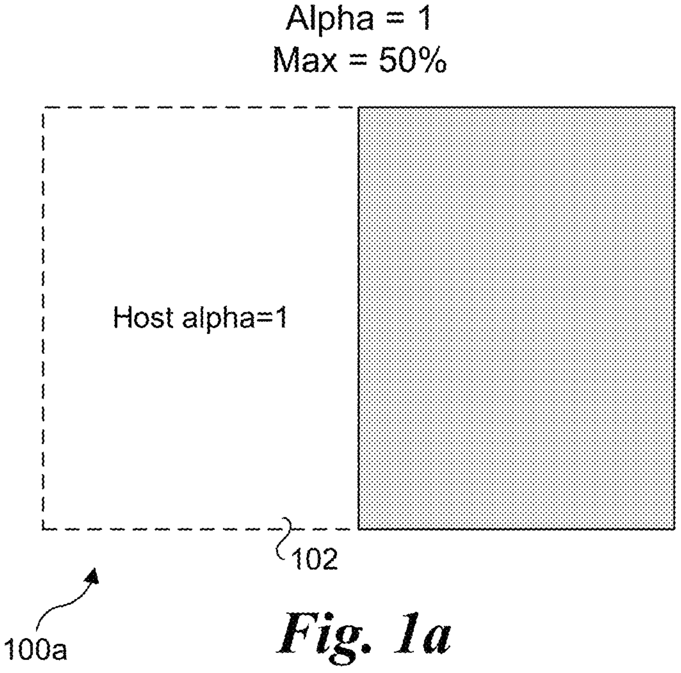
FIG. 1*a* shows an example of using an alpha parameter for a host in a shared buffer.
Figure 1B:
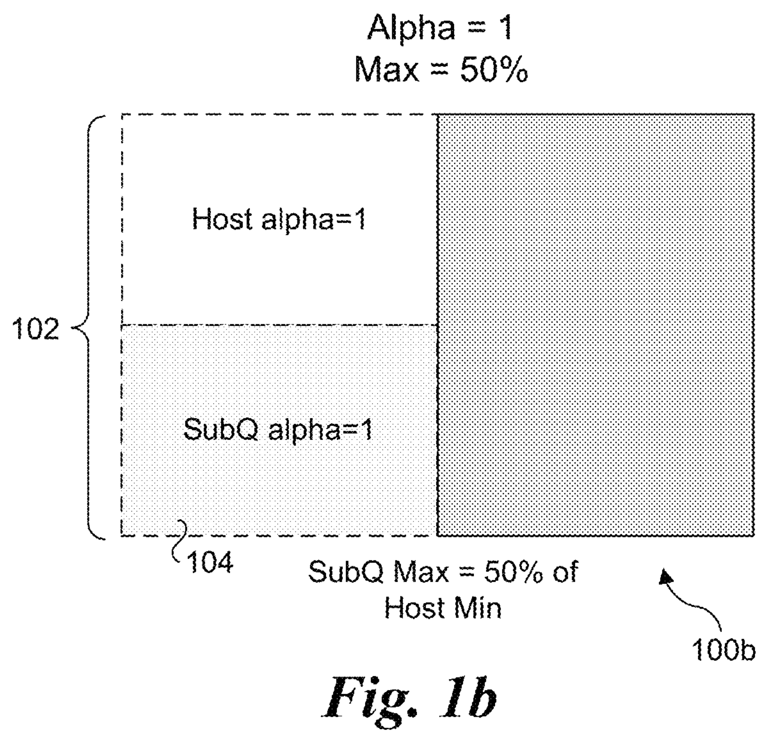
FIG. 1*b* shows an example of using a host alpha parameter and sub queue alpha parameter for a shared buffer.

FIGS. 1*a*-1*f* illustrate example configurations for shared buffers with Host alpha=1. Under shared buffer configuration 100*a* in FIG. 1*a*, Host alpha=1 and Max Buffer for a Host buffer 102=1(1+1)=50% of the total shared buffer space. Shared buffer configuration 100*b* in FIG. 1*b* shows an example of the Max Buffer for a SubQ buffer 104=50% of the Max Buffer of Host buffer 102, while the Max Buffer for the Host buffer 102 is 50% of the shared buffer space.

Under shared buffer configuration 100*c* of FIG. 1*c*, Alpha for each of 4 Hosts 106, 108, 110, and 112=1 and Min Buffer for all 4 Hosts=1/(1+4)=20%. Under shared buffer configuration 100*d* of FIG. 1*d*, the buffer space allocated to the first Host 106 includes a SubQ 114 where alpha=1. Thus, the Max Buffer for SubQ 114 is 50% of Host 106.

Figure 1E:
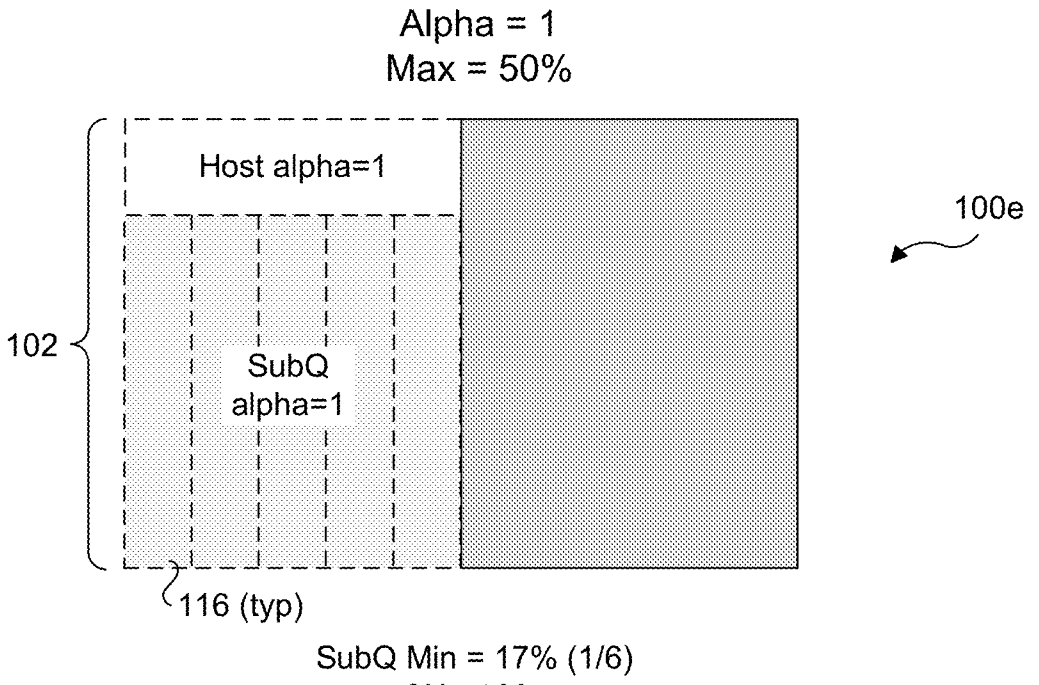
FIG. 1*e* shows a shared buffer configuration showing a host buffer having five sub queue buffers.
Figure 1F:
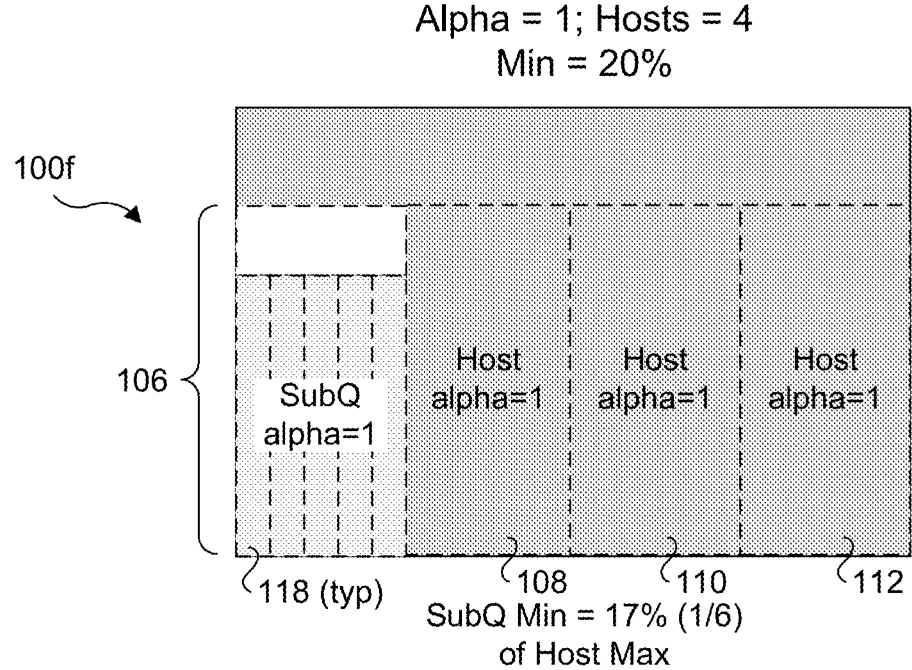
FIG. 1*c* shows a shared buffer configuration using four host and four alpha parameters set to 1.
FIG. 1*d* shows a shared buffer configuration that is a modified configuration of FIG. 1*c* under which a portion of the buffer space for a first host is allocated to a sub queue.

Under shared buffer configuration 100*e* of FIG. 1*e*, the buffer space for Host buffer 102 is allocated for 5 SubQs 116, with the Min Buffer for each SubQ 116=1/(1+5) =1/6=17%. Under shared buffer configuration 100*f* of FIG. 1*f*, the buffer space for Host 106 includes five SubQs 118, each having a SubQ Min of 17% of Host 106's buffer space.

Calculations

In the following equations, Host Alpha (Host_α) and Sub Queue alpha (SubQ_α) are used denote alpha parameters for host and sub queues. Bold test is related to configured parameters.

Available_buffer[Host] = Total_NIC_Packet_Buffer − (Occupied Buffer by other Hosts) (1)
Available_buffer[SQ, Host] = Available_buffer[Host]*(Host_α/(1+Host_α) − (Occupied Buffer by other SQs[Host]) (2)
Buffer Drop Threshold[Host] = Host_α * (a) (3)
Buffer Drop Threshold[SQ, Host] = SubQ_α * (b) (4)

Merging equations (1) and (2) yields:

Available_buffer[SQ,Host]=(Total_NIC_Packet_Buffer−(Occupied Buffer by other Hosts))*(Host_α/(1+Host_α)−Occupied Buffer by other SQs[Host])

$$SubQ_{Max} = \frac{(SubQ_\alpha)\times(Host_\alpha)\times\left(Total_{NIC_{Buffer}} - \text{Occupied Buffer by other Hosts}\right)}{((1+Host_\alpha)(1+SubQ_\alpha))} - (SubQ_\alpha)\times(\text{Buffer Occupied on other } SubQs)/(1+SubQ_\alpha)$$

Dynamic RED (DRED)

Dynamic RED (DRED) is a modified implementation of RED employing dynamic thresholds and probabilities. DRED employs a profile structure with three parameters: RED Low (Min) Threshold [%]; RED High (Max) Threshold [%], and RED Max Probability [%]. RED Min and Max %: Dynamic Thresholds when RED Drop or ECN marking will apply in percentage (1-100%) of Min and Max calculated using the above formulae. Both Min/Max % values can be same in some scenarios indicating 100% drop or ECN marking probability.

In one aspect, DRED is used for dropping packets and ECN marking packets on a SubQ. A graphical representation of the DRED function is shown in FIG. 2. The Low and High Thresholds for a SubQ are dynamically adjusted relative to the SQ Potential Buffer ($SQ_{max}$):

$$SubQ_{Max} = \frac{(SubQ_\alpha)\times(\text{Host}_\alpha)\times\left(\text{Total}_{NIC_{Buffer}} - \text{Occupied Buffer by other Hosts}\right)}{((1+\text{Host}_\alpha)(1+SubQ_\alpha))} - (SubQ_\alpha)\times(\text{Buffer Occupied on other } SubQs)/(1+SubQ_\alpha)$$

In one embodiment, DropProbability is calculated using the following equation:

$$DropProbability = MaxDropProbability \times \frac{(BufferOccupiedbySQ[SQ, Host] - SQMinThreshold)}{(SQMaxThreshold - SQMinThreshold)}$$

In one embodiment SQ classification employs IP Differentiated Services Code Point (DSCP)-based SQ selection. This employs the DS (Differential Services) field in IPv4 and IPv6 headers, which is encoded as one of 64 DSCP values.

The per SQ RED/ECN profiles include the following, in one embodiment.

Up to two profiles per SQ

DSCP based profile selection within given SQ

RED/ECN Min and Max %: Dynamic Thresholds when RED Drop or ECN marking will apply in percentage (1-100%) of Min and Max calculated using the above formulae. Both Min/Max % values can be same in some scenarios indicating 100% drop or ECN marking probability RED Drop or RED ECN Marking Probability Profile structure includes 3 parameters:

RED Low Threshold[%]

RED High Threshold[%]

RED Max Probability[%]

In one embodiment, the logic used for the RED calculation is as follows:

```
If SQBuffer < Low T
  Action Prob = 0% // No Drop
ElseIf SQBuffer > High T
  Action Prob = 100% //Drop
Else
  Action Prob = MaxProb * (SQBuffer − Low T)/(High T− Low T)
```

In one embodiment, MaxProb is calculated is using pseudo random numbers generated in hardware.

Dual Alpha+DRED Algorithm

The following definitions and equations are employed by the dual alpha+DRED algorithm, according to one embodiment.

```
Drop T = Alpha x Free Buffer
Max Buffer = Alpha/(1+Alpha)
Min Buffer = Alpha/(1+Sum(All Alphas))
Host Potential Buffer − The buffer the host can grow up to
  = Available Buffer (Host) x Max Buffer(Host)
Total Free Buffer = Total Buffer − All Hosts OCs
Host Free Buffer = Host Potential Buffer − Host OC
Available Buffer (SQ) − The buffer available to all Host SQs
  = Host Free Buffer + SQ OC
SQ Potential Buffer − The buffer the SQ can grow up to
  = Available Buffer (SQ) x Max Buffer(SQ)
```

FIG. 3 shows a flowchart 300 illustrating operations and logic used for buffering or dropping a packet received at a port (e.g., a port on a NIC or other type of network device). The flow begins in a block 302 in which a packet is received at a port. In a block 304, host available buffer parameters are calculated. This includes the host buffer drop threshold and the potential (Max) Buffer size for the host buffer. From above, the host buffer drop threshold, Drop T=Alpha*Free Buffer.

Next, in a block 306 the Host's SQ available buffer parameters are calculated. This includes the Host SubQ buffer drop threshold and the Host SubQ potential (Max) Buffer size. The same equations shown above for Host buffer parameters are likewise used for SubQ buffer parameters.

In a block 308 a host drop decision is made. This entails comparing the Host OC to the Host Buffer drop threshold Drop T calculated in block 304. In a block 310 a SubQ drop decision is also made. This entails comparing the Host SubQ OC to the Host SubQ Buffer drop threshold Drop T calculated in block 306.

In a decision block 312 a determination is made to whether both the Host drop decision and the Host SubQ drop decision fail (i.e., both decisions are the drop threshold is not reached). If the answer is NO, the logic proceeds to a block 313 in which the packet is dropped. If the answer to decision block 312 is YES, the logic proceeds to a block 314 in which the host potential (Max) Buffer size calculated in block 304 is used for a Host RED decision of either Drop or ECN mark. {ECN marking comprises . . . } Similarly, in a block 316 the host potential (Max) Buffer size calculated in block 306 is used for a Host RED decision of either Drop or ECN mark. As shown in a block 318, if either RED decision succeeds (i.e., result in a Drop) the packet is dropped or ECN marked. In decision block 320 a determination is made to whether the packet has been dropped. If the answer is NO, the logic proceeds to a block 322 in which the packet is written to an applicable Host or SubQ buffer, and the Host OC and SubQ OC are updated.

EXAMPLE CONFIGURATIONS

Example 1 (Applying only SubQ RED)

4 Hosts
4 SQ
Host α=1
SQ α=1
Total Buffer Size=2048 K B
Max_RED_Percentage parameter=50%
Min_RED_Percentage parameter=10%
Max_RED_Prob=60%
Time t=0, for Host2 and SQ1 for Host2
Available_Buffer=2048−=2048 KB
SubQ[Max]=((1)×(1)×(2048))/(1+1)*(1+1)=2048/4=512 KB
SubQ_Max_Threshold=512*65%=333 KB
SubQ_Min_Threshold=512*10%=52 KB
Drop Prob=0%
Time t=x, for Host2 and SQ1 for Host2
Occupied Buffer by other Hosts=500 KB
Occupied Buffer by other SQs[Host2]=100 KB
Occupied Buffer by SQ1[Host2]=50 KB
Available Buffer(Host2,SQ1)=674 KB
SubQ[Max]=337 KB
SubQ_Max_Threshold=337*65%=219 KB
SubQ_Min_Threshold=337*10%=34 KB
Drop Prob=5%
Time t=x, for Host2 and SQ1 for Host2
Occupied Buffer by other Hosts=500 KB
Occupied Buffer by other SQs[Host2]=0 KB
Occupied Buffer by SQ1[Host2]=100 KB
Available Buffer 774 KB
SubQ[Max] 387 KB
SubQ_Max_Threshold=387*65%=252 KB
SubQ_Min_Threshold=387*10%=39 KB
Drop Prob=17%

Example 2 (Applying Only SubQ RED)

4 Hosts
8 SQ per Host
Host α=16
SQ α=16
Total Buffer Size=2048 K B
Max_RED_Percentage parameter=55%
Min_RED_Percentage parameter=5%
Max Prob=80%
Time t=0, for Host2 and SQ1 for Host2
Available Buffer=2048−0=2048 KB
SubQ[Max]=((16)×(16)×(2048))/(1+16)*(1+16)=256*2048/289=1814 KB
SubQ_Max_Threshold=1814*55%=998 KB
SubQ_Min_Threshold=1814*20%=91 KB
Drop Prob=0%
Time t=x, for Host2 and SQ1 for Host2
Occupied Buffer for other Hosts=600 KB
Occupied Buffer for other SQs[Host2]=200 KB Occupied Buffer by SQ1[Host2]=50 KB
Available Buffer=1163 KB
SubQ[Max]=1094 KB
SubQ_Max_Threshold=1105*55%=602 KB
SubQ_Min_Threshold=1105*5%=55 KB
Drop Prob=0%
Time t=x, for Host2 and SQ1 for Host2
Occupied Buffer for other Hosts=400 KB
Occupied Buffer for other SQs[Host2]=200 KB
Occupied Buffer by SQ1[Host2]=150 KB
Available Buffer=1351 KB
SubQ[Max]=1272 KB
SubQ_Max_Threshold=1283*55%=700 KB
SubQ_Min_Threshold=1283*20%=64 KB
Drop Prob=10%

FIGS. 4*a*, 4*b*, and 4*c* show example shared buffer configurations for Host OCs. Generally, for a give Free Buffer state the bigger the Host OC the bigger the Potential Buffer. Meanwhile, in these examples the host buffer drop threshold (Drop T) remains constant. Also, the Potential Buffer calculations are applied for a single Host (the first Host in these examples)

Shared buffer configuration 400*a* in FIG. 4*a* includes 4 Host buffers 402, 404, 406, and 408 allocated to respective Hosts 1, 2, 3, and 4. In this example, Host Max is 700 KB, which is 50% of the Free Buffer space 1400 KB). Under this initial condition, none of the buffer space for Host 1 is occupied (OC=0), while each of Host buffers 404, 406, 408 are fully occupied (and thus labeled Host 2 OC, Host 3 OC, and Host 4 OC).

Under shared buffer configuration 400*b* of FIG. 4*b*, a portion of formerly occupied buffer space for Host buffer 408 has been added to the Free Buffer space, while the portion of the buffer space in Host buffer 402 labeled Host 1 OC is now occupied. In this example the Host 1 OC value=200, which represents a portion of the Host 1 buffer 402 that is occupied. The Potential Buffer size is now calculatedc as 50%*(OC+Free), which results in an increased to 800 KB, with the increase in the Potential Buffer size depicted by portion 410 of the Free Buffer space.

Under shared buffer configuration 400*c* of FIG. 4*c*, a portion of Host buffer 406 has been added to Host buffer 402, and Host 1 OC has increased to 400. Using the same equation for the Potential Buffer size (50%*(OC+Free)) yields an increase to 900 KB, with the increase depicted by portion 412.

Shared Buffer Configuration Parameters for Two-Level Alpha Multi-Host Buffering with RED Dynamic Mode The configuration parameters for a two-level alpha multi-host includes a per Host alpha and a per SQ alpha. The threshold values ("to_alpha") for the pool will be used to compute the alpha parameter for Hosts and SQs according to formula: *alpha = 2 ^ (alpha_power_2)*

In one exemplary and non-limiting embodiment the range of *alpha_power_2* is between −5 and 5, which yields Alpha values of 1/32, 1/16, 1/8, 1/4, 1/2, 1, 2, 4, 8, 16, 32. In one embodiment there are up to 4 Hosts and up to 8 SQs per Host for a maximum of 32 SQs. Generally, the number of Hosts may two or more, and the number of SQs for a given Host may be one or more.

Examples of shared buffer configurations further adding SubQ buffers are shown in FIGS. 5*a*-5*d*. Each of these shared buffer configurations include 4 Host buffers 502, 504, 506, and 508, and the Free Buffer space is 1400 KB. In the following description the configurations of the shared buffer are described relative to the configuration of the previous shared buffer, beginning with an initial configuration in FIG. 5*a*.

Figure 5A:
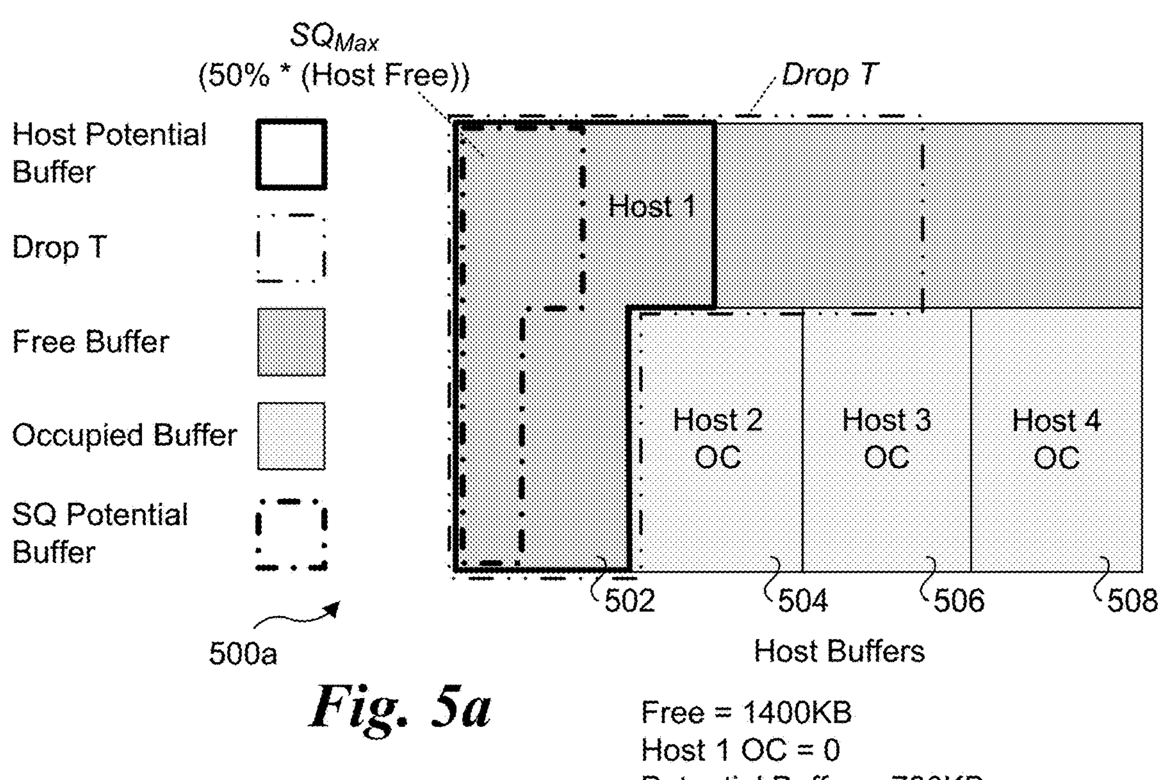

As shown in shared buffer configuration 500*a* of FIG. 5*a*, each of Host buffers 504, 506, and 508 is shown as being fully occupied and corresponds to a respective Host OC (Host 2 OC, Host 3 OC, Host 4 OC), with the remaining buffer space (1400 KB) shown as Free Buffer space. $SQ_{Max}$, the SQ Potential Buffer is 350 KB, 50%*(Host Free Buffer size (700 KB)).

Figure 5B:
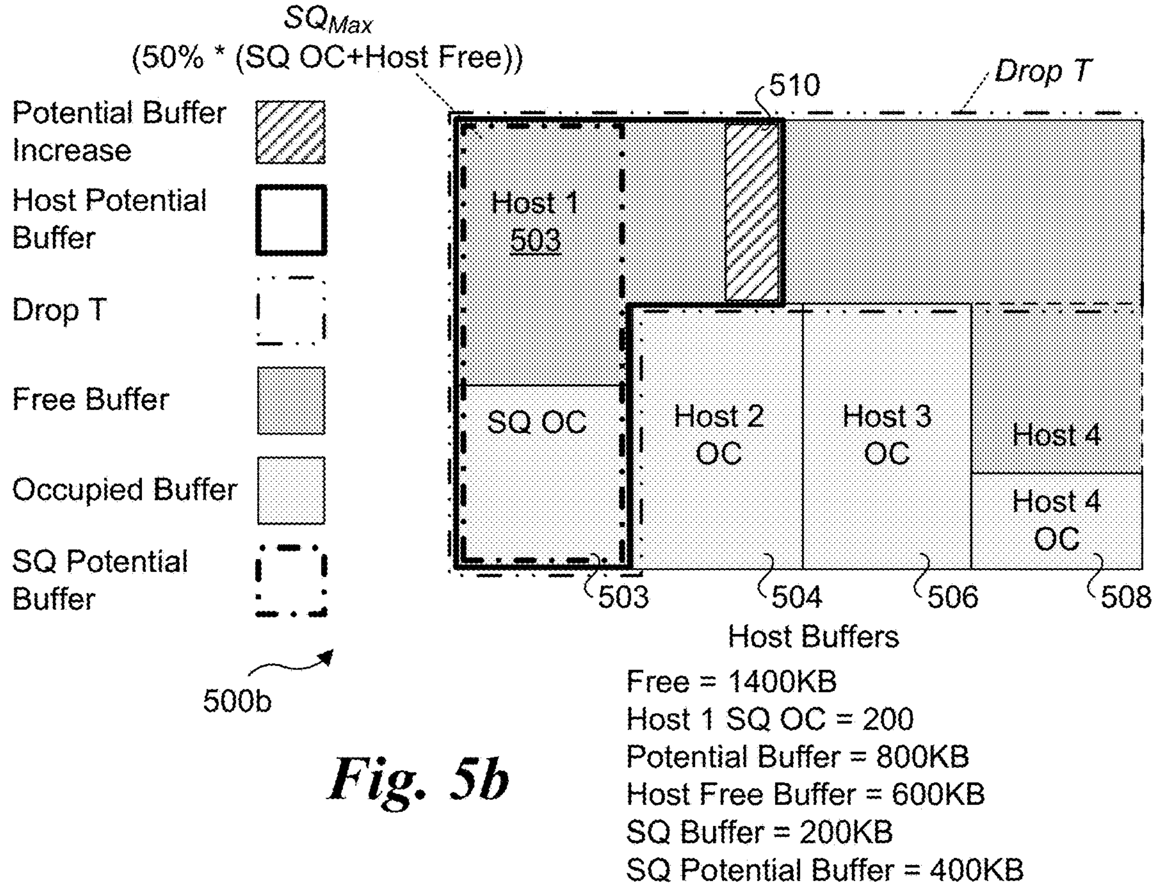

Under shared buffer configuration 500*b* in FIG. 5*b*, a portion of Host buffer 508 has been freed and a portion of the Free Buffer space in configuration 500*a* is now occupied by SQ OC 503, Host 1 SQ OC is 200, and the freed portion of Host buffer 508 is now depicted as part of the Free Buffer space, which remains at 1400 KB. Based in part on the increase in OC, the Potential Buffer has increased to 800 KB (with the increase depicted by area 510), SQ Buffer is 200 KB, and SQ Potential Buffer is 400 KB. The Drop T maximum threshold has also increased.

Figures 5C, 5D:
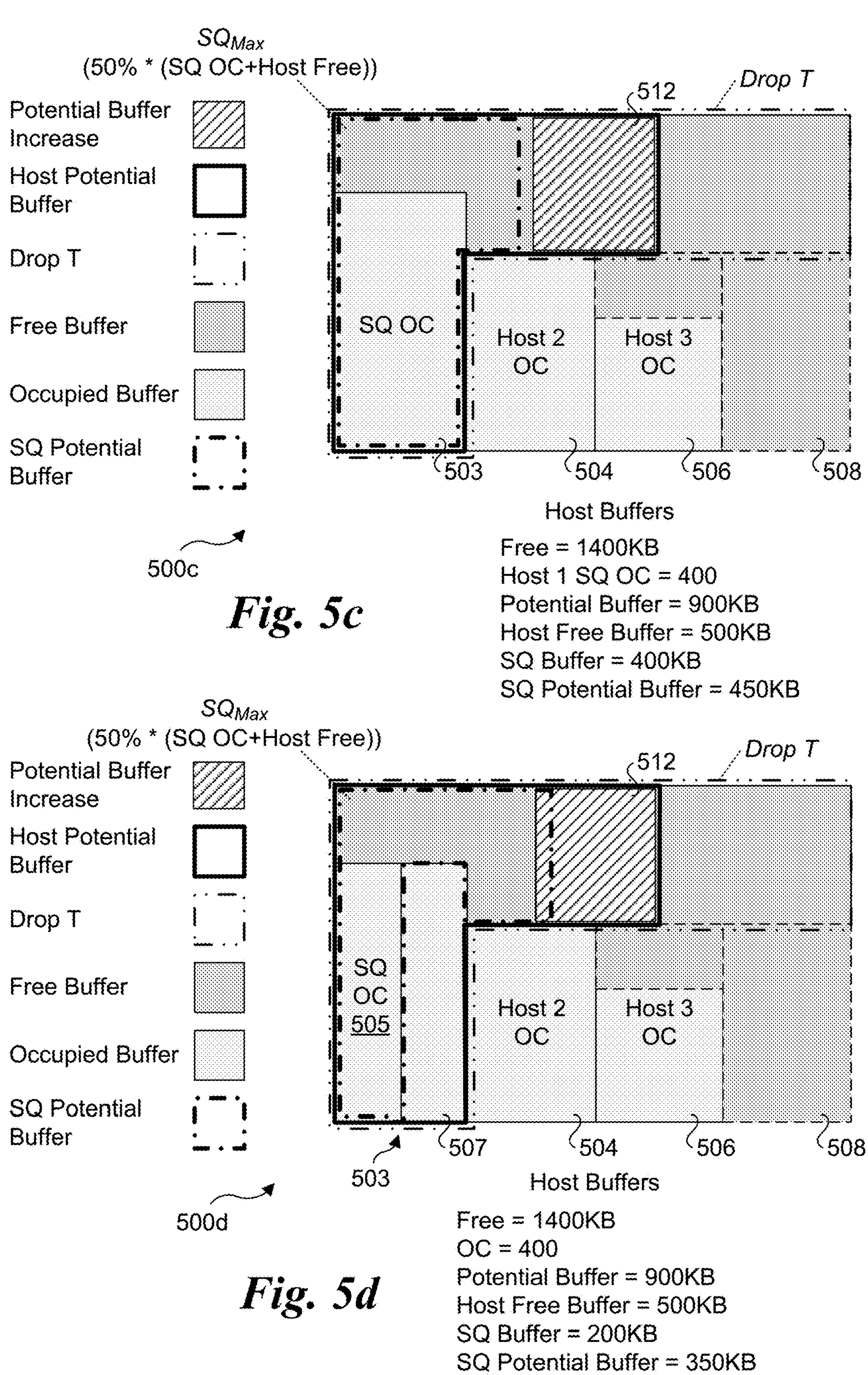

Under shared buffer configuration 500*c* in FIG. 5*c*, SQ OC 503 has increased while the occupancy level of Host OC 506 has decreased by the same amount as the increase and all of Host buffer 508 is now free space. SQ OC 503 has increased to 400. The Potential Buffer has been increased to 900 KB (as depicted by an area 512), while the Host Free Buffer has been decreased to 500 KB. The SQ Buffer is 400 KB, and the SQ Potential Buffer ($SQ_{max}$) is now 450 KB.

Under shared buffer configuration 500*d* in FIG. 5*d*, SQ OC 503 has been split into two SQs 505 and 507. The Host 1 SQ OC remains at 400, the Host Potential Buffer remains at 900 KB, and the Host Free Buffer remains at 500 KB. The SQ Buffer has been reduced from 400 KB to 200 KB, and the SQ Potential Buffer ($SQ_{Max}$) has been decreased from 450 KB to 350 KB.

Implementation Apparatus and Environments

FIGS. 6, 7, and 8 respectively show systems 600, 700, and 800 illustrating exemplary apparatus and environment in which aspects of the embodiments described and illustrated herein may be implemented. System 600 includes a "foundational NIC" ("fNIC") PCIe (Peripheral Component Interconnect Express) card 602 including a circuit board 603 having a PCIe edge connector 604 and to which various integrated circuit (IC) chips and components are mounted, including a pair of optical modules 605 and 606 at respective network Port 1 and Port 2. The IC chip shown comprises an fNIC chip 608 including on-die memory 609. In addition, fNIC card 602 may include other ICs that are not shown for simplicity, as well as other circuitry components such as capacitors, resistors, etc. In this example, fNIC chip 608 is a multi-port Ethernet NIC that is configured to perform various Ethernet NIC functions, as is known in the art. Other fNIC cards may include a single network port, and the fNIC chip is a single-port Ethernet NIC.

Generally, fNIC chip 608 will include circuitry and logic for implementing various functionality associated with hardware-based packet processing operations. In addition, fNIC chip 608 includes embedded logic 616 configured to implement aspects of embodiments of 2-layer Alpha+Dynamic RED 618 described and illustrated herein. In some embodiments fNIC chip 608 is an Application Specific Integrated Circuit (ASIC) comprising pre-programmed logic for implementing the various functionality.

Each of Ports 1 and 2 may include sets of ingress and egress buffers 622 and 624 including one or more buffers 626 and 628. In one embodiment buffers 626 and 628 are circular FIFO (First-In, First-Out) buffers; optionally, other buffer structures may be used. In the illustrated embodiment, optical signals from an optical network(s) coupled to optical modules 605 and 606 are converted from an optical signal domain to an electrical signal domain via circuitry in the optical modules. Depending on the implementation, optical modules 605 and 606 may support Ethernet PHY (Physical Layer) and MAC (Media Access Channel) Layer functionality and be able to write packets extracted from Ethernet frames from the received optical signals. In other embodiments, the PHY and/or MAC Layer functionality is implemented via circuitry in fNIC chip 608, which may include internal ingress and egress buffers or write to external ingress and egress buffers. A block diagram of an exemplary fNIC 900 is shown in FIG. 9 and described below.

As depicted by shared memory configuration 500*d*, a portion(s) of on-die memory 609 is used for a shared buffer. During packet processing corresponding to flowchart 300 in FIG. 3 discussed above, packets are received from the network (as optical signals in this example, which are processed to extract individual packets) and those packets are buffered in ingress buffers. When a received packet is not dropped, it is copied from an ingress buffer to the shared buffer. During packet processing operations implemented by embedded logic 616, the packets will be classified and various other related operations may be performed. From the destination address of the packet and the packet classification (and potentially other packet header fields) the particular sub-queue to which the packet will be written is determined. For dropped packets, the packets are never written to the shared buffer. Rather, they will be subsequently overwritten in the ingress buffer.

System 600 further depicts four hosts 632, 634, 636, and 638 (also labeled Host 1, Host 2, Host 3, and Host 4) that are coupled to fNIC chip 608 over PCIe links that are coupled between the hosts and PCIe edge connector 604. Signals from PCIe edge connector 604 are coupled to an embedded PCIe interface on fNIC chip 608 via an x16 (16 lane) PCIe interconnect 630. Other PCIe link widths may be used, and the 16 (or other number of) lanes may be split to communicate with multiple PCIe endpoint devices, which in this case are hosts 632, 634, 636, and 638. Each of hosts 632, 634, 636, and 638 is further depicted as including a CPU/SoC 640.

In some embodiments, hosts 632, 634, 636, and 638 are separate physical servers. The servers may be embodied in various configurations, such as blade servers, server modules and the like. In some embodiments, the physical servers and fNIC card 602 may reside in the same chassis, drawer, or sled. In addition to a CPU/SoC, each of these servers would include other components that are known in the art, such as memory, firmware, software (operating system(s) and applications), etc. In some embodiments the servers may be configured to support virtualized systems, such as systems including multiple virtual machines (VMs) or multiple containers.

In other embodiments, CPU/SoCs 640 are "sockets" installed in a multi-socket platform and the CPU/SoC sockets are hosts 632, 634, 636 and 638. In this case, system 600 would include further components that are generally provided with a multi-socket platform, such as memory, firmware, software, etc.

System 700 in FIG. 7 includes a SmartNIC PCIe card 702 including a circuit board 703 having a PCIe edge connector 704 and to which various IC chips and components are mounted, including a pair of optical modules 605 and 606 at respective network Port 1 and Port 2. The IC chips include a SmartNIC chip 708 including on-die memory 709, an embedded processor 710 and memory (e.g., DDR4, DDR5, DDR6 or LPDDR5 (S)DRAM) chips 712 and 714. SmartNIC chip 708 is a multi-port Ethernet NIC that is configured to perform various Ethernet NIC functions, as is known in the art. In some embodiments, SmartNIC chip 708 is an FPGA and/or includes FPGA circuitry. SmartNIC PCIe card 702 further includes ingress buffers 622 and egress buffers 624 having a similar configuration and supporting similar functionality to ingress buffers 622 and egress buffers 624 discussed above for system 600.

Generally, SmartNIC chip 708 may include embedded logic for performing various packet processing operations, such as but not limited to packet classification, flow control, RDMA (Remote Direct Memory Access) operations, an Access Gateway Function (AGF), Virtual Network Functions (VNFs), a User Plane Function (UPF), and other functions. In addition, various functionality may be implemented by programming SmartNIC chip 708, via pre-programmed logic in SmartNIC chip 708, via execution of firmware/software on embedded processor 710, or a combination of the foregoing.

As depicted by embedded logic 716, the various functions and logic for implementing a network stack 718 and aspects of embodiments of 2-layer Alpha+Dynamic RED 720 described and illustrated herein may be implemented by programmed logic in SmartNIC chip 708 or and/or execution of software on embedded processor 710.

As depicted by shared memory configuration 500*d*, a portion(s) of on-die memory 709 or memory 712 is allocated for a shared buffer. As before, during packet processing corresponding to flowchart 300 in FIG. 3, packets are received from the network (as optical signals in this example, which are processed to extract individual packets) and those packets are buffered in ingress buffers 622. When a received packet is not dropped, it is copied from an ingress buffer to the shared buffer. During packet processing operations implemented by embedded logic 716, the packets will be classified and various other operations may be performed. From the destination address of the packet and the packet classification (and potentially other packet header fields) the particular sub-queue to which the packet will be written is determined. For dropped packets, the packets are never written to a shared buffer. Rather, they will be subsequently overwritten in the ingress buffer.

As with system 600, system 700 includes four hosts 632, 634, 636, and 638 with CPU/SoCs 640. Hosts 632, 634, 636, and 638 are coupled to SmartNIC chip 708 over PCIe links that are coupled between the hosts and PCIe edge connector 704. Signals from PCIe edge connector 704 are coupled to an embedded PCIe interface on SmartNIC chip 708 (not separately shown) via an x16 PCIe interconnect 730. As before, other PCIe link widths may be used, and the 16 (or other number of) lanes may be split to communicate with multiple PCIe endpoint devices, which are hosts 632, 634, 636, and 638. As before, hosts 632, 634, 636, and 638 may comprise physical servers or may comprise sockets in a multi-socket platform.

FIG. 8 shows a system 800 including an Infrastructure Processing Unit (IPU) 802 comprising a PCIe card including a circuit board 803 having a PCIe edge connector 804 to which various IC chips and modules are mounted. The IC chips and modules include an FPGA/SoC 806 including on-die memory 807, a CPU/SoC 808, a pair of QSFP (Quad Small Form factor Pluggable) modules 809 and 810, memory (e.g., DDR4, DDR5, DDR6 or LPDDR5 (S)DRAM) chips 812 and 814, and non-volatile memory 816 used for local persistent storage. FPGA/SoC 806 includes a PCIe interface (not shown) connected to PCIe edge connector 804 via an x16 PCIe interconnect 820 which in this example is 16 lanes.

Similar to above, embedded logic 716 depicts the various functions and logic for implementing a network stack 718 and aspects of embodiments of 2-layer Alpha+Dynamic RED 620 described and illustrated herein may be implemented by programmed logic in FPGA/SoC 806 or and/or execution of software on CPU/SoC 808. FPGA/SoC 806 may include logic that is pre-programmed (e.g., by a manufacturing) and/or logic that is programmed in the field (e.g., using FPGA bitstreams and the like). For example, logic in FPGA/SoC 806 may be programmed by a host CPU for a platform in which IPU 802 is installed. IPU 802 may also include other interfaces (not shown) that may be used to program logic in FPGA/SoC 806. In place of QSFP modules 809 and 810, wired network modules may be provided, such as wired Ethernet modules (not shown). As depicted by shared memory configuration 500*d*, a portion(s) of on-die memory 807 or memory 812 is allocated for shared buffers.

CPU/SoC 808 employs a System on a Chip including multiple processor cores. Various CPU/processor architectures may be used, including but not limited to x86, ARM®, and RISC architectures. In one non-limiting example, CPU/SOC 808 comprises an Intel® Xeon®-D processor. Software executed on the processor cores may be loaded into memory 814, either from a storage device (not shown), for a host, or received over a network coupled to QSFP module 809 or QSFP module 810.

In some embodiments, FPGA/SoC 806 is an IPU chip having an SoC architecture including multiple processor cores. An example of an IPU chip 1000 is shown in FIG. 10 described below. When FPGA/SoC 806 is an IPU chip, the inclusion of CPU/SoC 808 is optional.

As above, Port 1 and Port 2 of IPU 802 may be coupled to ingress buffers 622 and egress buffers 624 including FIFOs 626 and 628. Also as above, depending on the functionality provided by QSFP modules 809 and 810, the PHY/MAC Layer operations may be performed by the QSFP modules or may be split between the QSFP modules and circuitry on FPGA/SoC 806. In some embodiments, ingress and egress buffers may be implemented on-chip (on FPGA/SoC 806), while in other embodiments the ingress and egress buffers are external to FPGA/SoC 806.

System 800 also includes four hosts 632, 634, 636, and 638, each of which includes a PCIe interface (not shown) that is connected via a PCIe link to PCIe signals for PCIe edge connector 804. As before, hosts 632, 634, 636, and 638 may comprise physical servers or may comprise sockets in a multi-socket platform.

The PCIe interfaces and links herein are illustrative and non-limiting examples of Input/Output (I/O) interfaces and links. Other types of I/O interfaces and links may be used, such as but not limited to Compute Express Links (CXL), which use one or more CXL protocols over PCIe infrastructure.

FIG. 9 shows selected blocks for an exemplary fNIC 900. As illustrated in this example, fNIC 900 includes a PCIe PHY 902, which can refer to a physical (PHY) layer of the PCIe connection that includes digital logic that prepares packets (e.g., TLPs (transaction layer packets)) for serial transmission on a communication link (and reversing that process for inbound packets) as well as an electrical analog interface that connects to the communication link and consists of differential drivers and receivers for each lane. The PCIe PHY 902 is coupled to a PCIe controller 904 that manages the PCIe interface to devices that are connected to fNIC 900 over a PCIe link, such as Hosts/CPUs in the embodiments herein.

fNIC 900 further includes an enumeration controller 906 to manage a process of detecting external devices (such as Hosts/CPUs) connected to fNIC 900. For example, in some embodiments, enumeration controller 906 implements PCIe enumeration operations in accordance with one of more PCIe protocols. Such PCIe enumeration operations are used to identify PCIe endpoint devices (e.g., Hosts, CPUs, as well as PCIe interconnect structures). Enumeration control 906 stores configuration, capabilities, and security information gathered during PCIe enumeration in a registry 908.

fNIC 900 also includes an fNIC core 910 having compute functionality, memory, transport functionality, and 2-Layer Alpha+DRED functionality. In one embodiment, fNIC core 910 can be referred to herein as core circuitry.

fNIC 900 also includes circuitry to facilitate communication over a network, such as but not limited to Ethernet in the illustrated example. The circuitry includes an Ethernet PHY/MAC (Media Access Channel) block 914 that performs PHY and MAC layer functions for one or more Ethernet standards and extracts packets 916 from Ethernet frames. The network circuitry also includes a PCIe encapsulation/decapsulation block 918.

PCIe encapsulation/decapsulation block 918 is used to encapsulate PCIe TLPs to be sent outbound onto the network from a network port coupled to Ethernet PHY/MAC block 914 (not shown) and to decapsulate encapsulated PCIe TLPs from network packets received from the network at the network port.

The fNIC core 910 can include a lookup table, such as content addressable memory (CAM) 922, that matches a key (e.g., Host/CPU ID, bus device function, and/or address mapped to a BAR) to a network address of a destination remote Host/CPU or to a locally attached Host/CPU. In one example, a PCIe {Bus, Device, Function} or process address space ID (PASID) is mapped to an RDMA queue pair (QP) in the CAM 922. The fNIC core 910 may also include an RDMA backend 924, that encapsulates the PCIe TLPs in a transport and sends the encapsulated TLP over an RDMA transport to the targeted remote Host as determined based on the CAM 922 table lookup. Alternately, in some embodiments, other transports, such as TCP, may be used over any type of communication media.

fNIC core 910 also includes Host/SubQ logic 926 and 2-layer Alpha+Dynamic RED 928, and is coupled to on-die memory 930. As described and shown for system 600 of FIG. 6 above, on-die memory 930 may be used for implementing shared buffers in accordance with the embodiments described herein. Host/SubQ logic 926 is configured to inspect packet headers and determine which Host buffer and/or SubQ the packet is to be buffered in the shared buffer implemented in on-die memory 930. 2-layer Alpha+Dynamic RED 928 is used to determine whether a packet that is targeted for a particular Host buffer or SubQ buffer is dropped, ECN marked and stored in the shared buffer, or stored in the shared buffer without ECN marking.

FIG. 10 shows an IPU chip 1000 that may be installed on a main board of a compute platform or may be included on a daughterboard or an expansion card, such as but not limited to a PCIe card. IPU chip 1000 includes a 4th generation PCIe interface 1002 including 16 lanes. The PCIe PHY operations for PCIe interface 1002 include a PCIe Serdes (Serializer/Deserializer) block 1004.

In the illustrated embodiment, PCIe interface 1002 supports SR-IOV (Single Root-I/O Virtualization) and S-IOV (Scalable I/O Virtualization). SR-IOV and S-IOV are facilitated by Physical Functions (PFs) 1006 and Virtual Functions 1008 that are implemented in accordance with SR-IOV and S-IOV specifications.

Next, IPU chip 1000 includes a set of IP blocks, as depicted by an RDMA block 1010, an NVMe block 1012, a LAN (Local Area Network) block 1014, a packet processing pipeline 1016, and inline cryptographic engine 1018, and a traffic shaper 1020.

IPU chip 1000 includes various circuitry for implementing one or more Ethernet interfaces, including a 200 Gigabits/second (G) Ethernet MAC block 1022 and a 56G Ethernet Serdes block 1024. Generally, the MAC and Ethernet Serdes resources in 200G Ethernet MAC block 1022 and 56G Ethernet Serdes block 1024 may be split between multiple Ethernet ports, under which each Ethernet port will be configured to support a standard Ethernet bandwidth and associated Ethernet protocol.

As shown in the upper right corner, IPU chip 1010 includes multiple ARM cores 1026 employing an ARM architecture. The ARM cores are used for executing various software components and application that may run on IPU chip 1000. ARM cores 1026 are coupled to a system level cache block 1028 which is used to cache memory accessed from one or more memory devices (not shown) coupled to memory controllers 1030. In this non-limiting example, memory controllers 1030 are LP DDR4 memory controllers and the memory devices are LP DDR4 memory devices. Other types of memory devices may also be employed (when corresponding memory interfaces are provided), such as LPDDR5 memory devices. More generally, an existing or future memory standard may be used.

The last two IP blocks for IPU chip 1000 include a lookaside cryptographic and compression engine 1032 and a management complex 1034. Lookaside cryptographic and compression engine 1032 supports cryptographic (encryption/description) and compression/decompression operations that are offloaded from ARM cores 1026. Management complex 1034 comprises logic for implementing various management functions and operations, such as the management and control operations.

Generally, logic for implementing the 2-layer Alpha+DRED embodiments described and illustrated herein may be implemented as part of packet processing pipeline 1016 or comprises firmware or embedded software that is executed on one or more of ARM cores 1026. Some IPU or DPU chips may also include a portion or portions of an FPGA that are available for programming custom logic, such as logic for implementing 2-layer Alpha+DRED. The shared buffers may be implemented using a portion of cache block 1028 or in external memory devices coupled to memory controllers 1030.

The 2-layer Alpha+DRED buffer management approach may also be implemented switches. FIG. 11 shows a switch 1100 depicted an example of such an implementation. Generally, switch 1100 employs conventional switch functionality while further adding the functionality employed by the embodiments disclosed herein. Accordingly, the description and illustrating of the conventional switch aspects are abstracted as the components and structures of conventional switches are well-known in the art and outside the scope of this disclosure.

Switch 1100 includes a plurality of IO ports 1102 that are configured to be coupled to a network or fabric. For example, if the network is an Ethernet network, IO ports 1102 are Ethernet ports and including circuitry for processing Ethernet traffic (e.g., Ethernet PHY and MAC circuitry). For a fabric, IO ports 1102 may employ applicable Host Fabric Interfaces (HFIs). When switch 1100 is a Compute Express Link (CXL) switch, IO ports 1102 are configured to support CXL interfaces and implement CXL protocols. Generally, IO ports 1102 may be configured to support networks or fabrics employing wired links (e.g., wired cable links) or optical fiber links. In the latter case, IO ports 1102 may further include optical modules (not shown for simplicity).

Each IO port 1102 includes a set of ingress buffers 1104 and egress buffers 1106 (only one pair of which is shown for simplicity). The ingress and egress buffers may employ multiple receive queues 1108 and transit queues 1110. In one embodiment, switch 1100 supports QoS using different traffic classes, where some queues are allocated for different QoS levels (such as prioritized traffic associated with high bandwidth data).

The operation of switching functionality and associated ingress and egress buffer utilization is collectively shown via a switching circuitry logic and buffers block 1112. This would include, among other circuitry, switchable crossbar circuitry or the like to facilitate transfer of data from queues in ingress buffers to queues in egress buffers. Switching circuitry logic and buffers block 1112 may also include logic for implementing Layer 3 and above functionality, in some embodiments (such as traffic classification for QoS and other purposes, detecting invalid packets, etc.).

The various logic and data structures shown and described herein may be implemented on a switch using appropriate embedded logic and circuitry. Such embedded logic may be implemented via execution of software/firmware on one or more processing elements, implementation of hardware-based logic such as preprogrammed logic (e.g., ASICs) and/or programmable logic (e.g., one or more FPGAs), or a combination of the two. In one embodiment, switch 1100 includes one or more CPUs or SoCs coupled to memory. In one embodiment, switch 1100 employs an IPU SoC chip that includes a plurality of processor cores in combination with FPGA circuitry. In addition, there is switch circuitry produced by various manufacturers such as switch chips that may be used for the conventional switching aspects of switch 1100.

In the illustrated example, switch 1100 includes a CPU/IPU 1114 coupled to memory 1116 and a firmware storage device 1118. Switch 1100 may also include an FPGA 1120 in some embodiment. In cases where CPU/IPU 1114 is an IPU, the IPU may include one or more embedded FPGAs. In one embodiment, the IPU is an Intel® IPU, such as but not limited to a Mount Evans IPU chip, which includes a multi-core CPU, on-chip memory controllers, and an FPGA that may be programmed for performing various packet processing operations.

Firmware storage device 1118 stores firmware instructions/modules that are executed on one or more cores in CPU/IPU 1114 to implement embedded logic 716 including network stack 718 and 2-Layer Alpha+Dynamic RED 720. The firmware instructions are loaded into memory 1116 and executed, with applicable data structures data structures being stored in memory 1116. Optional FPGA 720 may also be programmed to implement the functionality (in whole or in part) of one or more of network stack 718 and 2-Layer Alpha+Dynamic RED 720.

Generally, the 2-Layer Alpha+Dynamic RED scheme may be implemented for ingress and/or egress ports (which represent the upper-level entity) and traffic classes (which represent the lower-level entity. One or more buffers in switching circuitry logic and buffers 1112 may be implemented as shared buffers having the buffer space managed using 2-Layer Alpha+Dynamic RED.

As used herein, the terms and acronyms Infrastructure Processing Unit and IPU are described and illustrated in some embodiments. Similar components may be referred to as Data Processing Units and DPU chips by some vendors. Accordingly, the IPUs and IPU chips described and illustrated herein are also illustrative of DPUs and DPU chips.

In the foregoing examples, the upper-level entities are Hosts and the lower-level entities are Sub-Queues. However, this is merely exemplary and non-limiting, as the upper-level and lower-level entities may apply to various types of entities having a hierarchical relationship. In addition, the principles and teachings herein may be applied to buffer hierarchies having more than two layers/levels. For example, the buffer calculations may be recursively applied to third-level entities.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for operating a buffer, comprising:
- dynamically sharing the buffer across a plurality of upper-level entities using a first set of alpha parameters; and
- for at least one upper-level entity, dynamically sharing buffer space in an upper-level entity among one or more lower-level entities using a second set of alpha parameters.

2. The method of claim 1, wherein the upper-level entities comprise hosts, and the one or more lower-level entities comprise sub queues.

3. The method of claim 1, further comprising, for each of the upper-level entities, dynamically sharing the buffer space in the upper-level entity among the one or more lower-level entities associated with the upper-level entity using a respective second set of alpha parameters.

4. The method of claim 1, further comprising employing Dynamic Random Early Detection (DRED) to one or more buffers associated with at least one of the upper-level entities and lower-level entities, wherein DRED is used to determine whether a packet should be dropped or an Explicit Congestion Notification (ECN) field in a packet header should be marked, and wherein DRED uses dynamically determined thresholds.

5. The method of claim 4, wherein DRED is employed for both an upper-level entity and the one or more lower-level entities associated with the upper-level entity concurrently.

6. The method of claim 1, further comprising:
- for an upper-level entity,
  - calculating a current maximum buffer size; and
  - calculating a potential buffer comprising a maximum size the buffer can grow to.

7. The method of claim 1, further comprising calculating a maximum size the buffer for a lower-level entity can grow to.

8. The method of claim 7, further comprising dynamically determining a RED minimum threshold and an RED maximum threshold to be employed by Dynamic Random Early Detection (DRED) for the lower-entity buffer, wherein the RED minimum threshold and RED maximum threshold are determined as a function of the maximum size of a lower-entity buffer.

9. The method of claim 8, further comprising dynamically determining a drop probability to be used by DRED for the lower-entity buffer, wherein the drop probability is a function of at least the RED minimum threshold and the RED maximum threshold.

10. The method of claim 1, wherein the buffer resides in memory for one of a Network Interface Controller (NIC), SmartNIC, Infrastructure Processing Unit (IPU), a Data Processing Unit (DPU), or a switch.

11. An apparatus, comprising:
- a network port, configured to receive packets from a network;
- an Input/Output (I/O) interface, configured to couple the apparatus in communication with multiple hosts;
- memory; and
- circuitry and logic coupled to the network port and the memory to, implement a portion of the memory as a buffer;
  - dynamically share the buffer across the multiple hosts using a first set of alpha parameters, wherein the portion of memory space for the buffer is dynamically allocated for each host; and
- for at least one host, dynamically share buffer space allocated to that host among one or more sub queues using a second set of alpha parameters.

12. The apparatus of claim 11, wherein the circuitry and logic are further configured to:
- employ Dynamic Random Early Detection (DRED) for one or more host buffers or sub queue buffers, wherein DRED uses dynamically determined thresholds to determine whether a packet received at the network port should be dropped or an Explicit Congestion Notification (ECN) field in a packet header for the packet should be marked.

13. The apparatus of claim 12, wherein DRED is employed for both a host buffer and the one or more sub queue buffers associated with the host buffer concurrently.

14. The apparatus of claim 11, wherein the circuitry and logic are further configured to:
- calculate a host potential buffer comprising a maximum size a host buffer can grow to; and
- calculate a sub queue potential buffer ($SQ_{max}$) comprising a maximum size a sub queue buffer can grow to.

15. The apparatus of claim 14, wherein the circuitry and logic are further configured to dynamically determine, as a function of $SQ_{max}$, a RED minimum threshold and a RED maximum threshold to be employed by Dynamic Random Early Detection (DRED) for the sub queue buffer.

16. The apparatus of claim 11, wherein the apparatus is one of a Network Interface Controller (NIC), SmartNIC, Infrastructure Processing Unit (IPU), a Data Processing Unit (DPU), or a switch.

17. An integrated circuit (IC) configured to be installed in an apparatus having a network port and an Input/Output (I/O) interface used to facilitate communication with multiple hosts, the IC comprising circuitry and logic to:
- implement a portion of on-die memory internal to the IC or memory external to the IC as a buffer;
- dynamically share the buffer across the multiple hosts using a first set of alpha parameters; and
- for at least one host, dynamically share buffer space allocated to that host among one or more sub queues using a second set of alpha parameters.

18. The IC of claim 17, further comprising the circuitry and logic to:
- employ Dynamic Random Early Detection (DRED) for one or more host buffers or sub queue buffers, wherein DRED uses dynamically determined thresholds to determine whether a packet received at the network port should be dropped or an Explicit Congestion Notification (ECN) field in a packet header for the packet should be marked.

19. The IC of claim 18, further comprising the circuitry and logic to:

calculate a sub queue potential buffer ($SQ_{max}$) comprising a maximum size a sub queue buffer can grow to; and dynamically determine, as a function of $SQ_{max}$, a RED minimum threshold and a RED maximum threshold to be employed by DRED for the sub queue buffer.

20. The IC of claim 17, wherein a portion of the circuitry comprises a Field Programmable Gate Array (FPGA).

* * * * *